United States Patent
Nakayama

(10) Patent No.: US 8,217,767 B2
(45) Date of Patent: Jul. 10, 2012

(54) VEHICLE PRESENCE NOTIFICATION APPARATUS

(75) Inventor: Toshiaki Nakayama, Miyoshi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/154,681

(22) Filed: Jun. 7, 2011

(65) Prior Publication Data

US 2011/0304445 A1    Dec. 15, 2011

(30) Foreign Application Priority Data

Jun. 9, 2010   (JP) .................................. 2010-132107
Jun. 17, 2010  (JP) .................................. 2010-138449

(51) Int. Cl.
*G08B 3/00*   (2006.01)
*B60Q 1/00*   (2006.01)
*G10K 9/00*   (2006.01)

(52) U.S. Cl. ............. 340/384.1; 340/384.3; 340/384.73; 340/388.1; 340/474; 116/137 R; 701/22; 381/86; 367/91

(58) Field of Classification Search ................ 340/384.1, 340/384.3, 388.1; 381/86
See application file for complete search history.

(56) References Cited

U.S. PATENT DOCUMENTS

| 2005/0200462 A1* | 9/2005 | Maekawa et al. | ............. 340/435 |
| 2005/0286346 A1* | 12/2005 | Croft et al. | .................... 367/140 |
| 2007/0257783 A1* | 11/2007 | Matsumoto et al. | ........ 340/425.5 |

FOREIGN PATENT DOCUMENTS

| JP | 58-162994 | 9/1983 |
| JP | 2000-209691 | 7/2000 |
| JP | 3252803 | 11/2001 |
| JP | 2005-289175 | 10/2005 |
| JP | 2008-258863 | 10/2008 |

* cited by examiner

*Primary Examiner* — Donnie Crosland
(74) *Attorney, Agent, or Firm* — Nixon & Vanderhye PC

(57) ABSTRACT

A vehicular horn device of an existing electromagnetic type is used as a dynamic speaker so as to generate a false engine sound. The shortage of a low-pitched sound in a parametric speaker device is complemented with a false engine sound which the vehicular horn device generates. Thereby, without need of mounting a large-sized dynamic speaker such as a woofer in a vehicle, a false engine sound is generated so as to model for a real engine sound. In addition, as the vehicle approaches a pedestrian, a sound tone of the false engine sound which the pedestrian hears changes, enabling the pedestrian to easily notice the approach or presence of the vehicle.

11 Claims, 13 Drawing Sheets

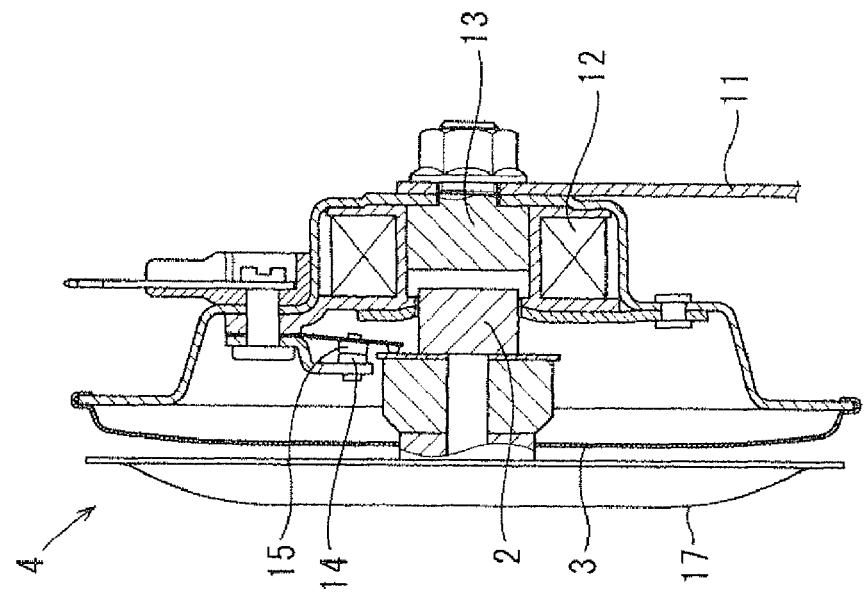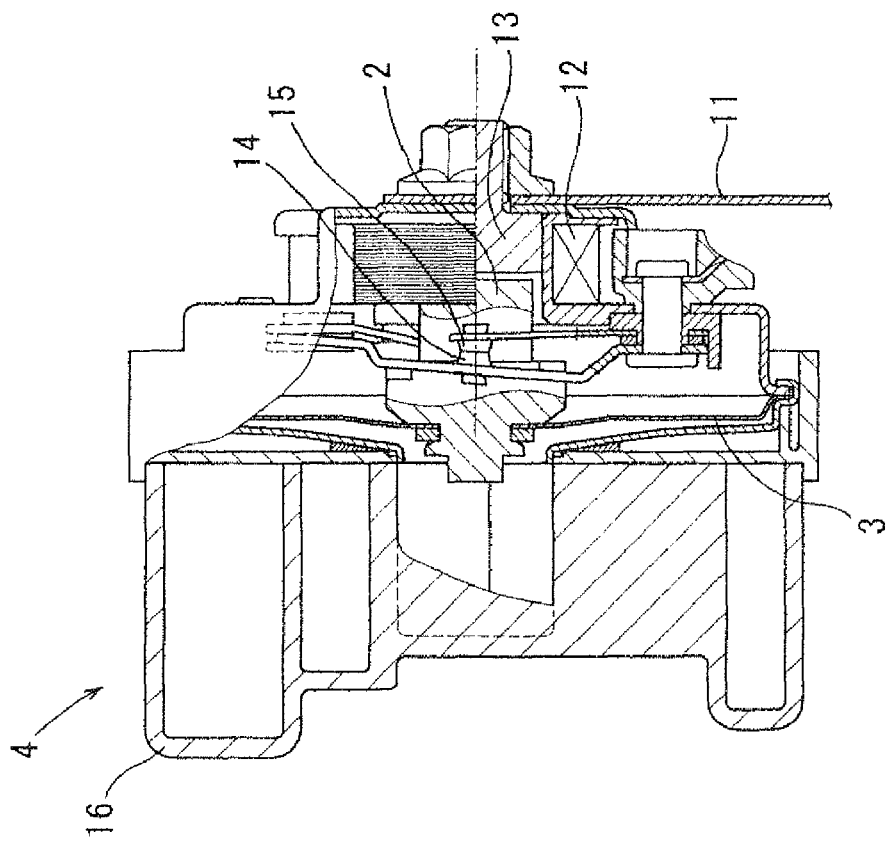

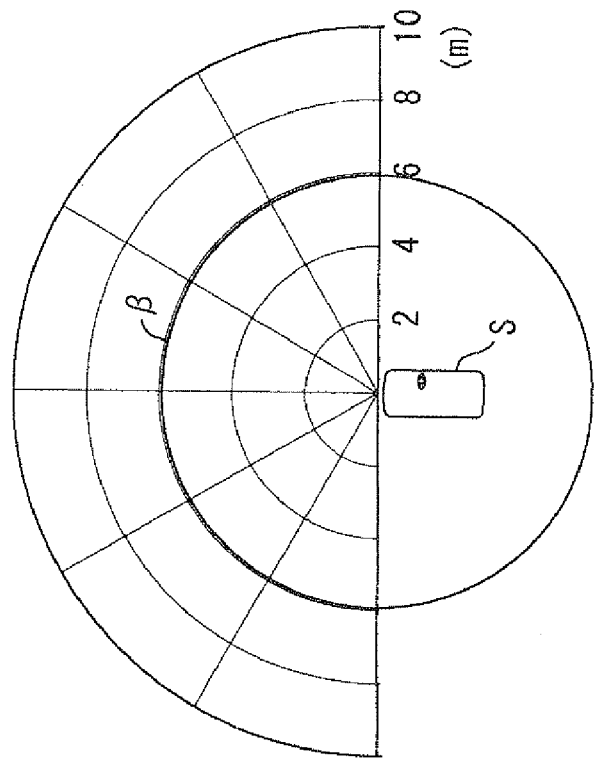
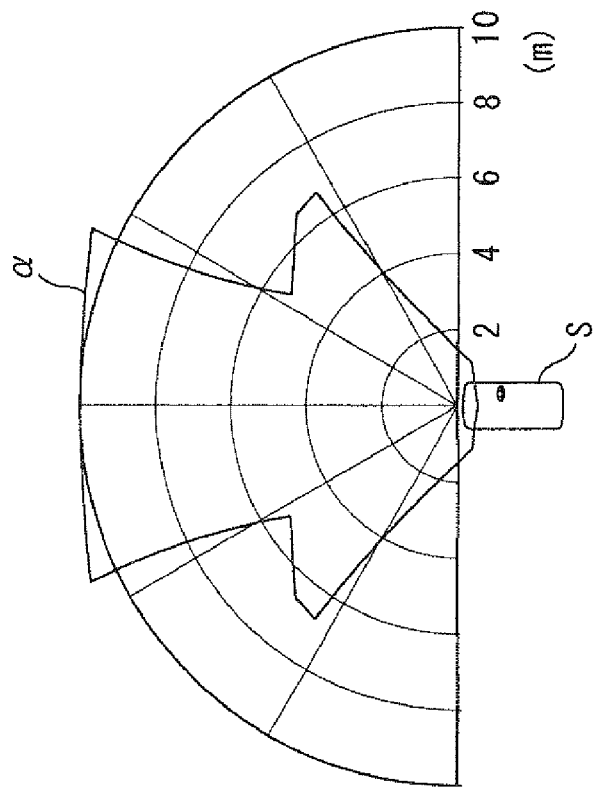
FIG. 5A
FIG. 5B

VEHICLE PRESENCE NOTIFICATION APPARATUS

CROSS REFERENCE TO RELATED APPLICATION

The present application is based on and incorporates herein by reference Japanese Patent Application No. 2010-132107 filed on Jun. 9, 2010 and Japanese Patent Application No. 2010-138449 filed on Jun. 17, 2010.

FIELD OF THE INVENTION

The present invention relates to a vehicle presence notification apparatus that generates a notice sound such as a false engine sound outside of a vehicle to announce a presence of the vehicle in a vicinity of the vehicle. In particular, it relates to a technology suitably used in a vehicle driven by an electric motor which generates rotation power on electricity such as an electric vehicle, a fuel cell vehicle, or a hybrid vehicle.

BACKGROUND OF THE INVENTION

[Patent document 1] JP 2005-289175 A

There is a vehicle outputting a small traveling sound such as a vehicle driven on electric motor. Such a vehicle is not easily noticed by a pedestrian, posing a problem. To that end, there has been proposed a technology to cause a vehicular dynamic speaker mounted in a vehicle to output a notice sound such as a false engine sound towards an outside of the vehicle for announcing the presence of the vehicle in a vicinity of the vehicle (refer to Patent document 1). The above dynamic speaker is defined as directly emitting an audible sound.

The frequency range peculiar to a real engine sound is from about 4 Hz to about 250 kHz, for instance. If modeling after the real engine sound, a false engine sound is needed to have frequency levels comparable to those of the real engine sound in the frequency range from about 4 Hz to about 250 kHz.

Then, it has been proposed that the false engine sound having frequency levels approximately comparable to those of the real engine sound be outputted using a dynamic speaker. In such a case, in order to reproduce a low-pitched sound range of 800 Hz or less of the false engine sound, it is further proposed to mount a dynamic speaker adopting a large-sized cone type vibrating plate such as a woofer in a vehicle. In this regard, however, such a proposal poses a problem A1, such as increasing a difficulty in attachment in the vehicle, increasing a weight of the vehicle, or increasing costs.

In contrast, instead of the technology using a dynamic speaker, it may be proposed a technology that generates a notice sound such as a false engine sound outside of a vehicle using a parametric speaker device containing an ultrasonic wave speaker so as to announce the presence of the vehicle (it is not a well-known technology). The technology of generating a notice sound such as a false engine sound with a parametric speaker device is achieved by applying an ultrasonic modulation to a waveform signal of a notice sound such as a false engine sound to radiate via an ultrasonic wave speaker. The ultrasonic wave (sonic wave not heard by an ear of a human being) radiated from the ultrasonic wave speaker contains amplitude components, which will undergo a self-demodulation in the air in a course of the transmission or propagation. The notice sound is thereby generated (i.e., become audible) at a position distant from the vehicle.

Thus, the use of the parametric speaker device enables the radiation of the ultrasonic waves of which amplitude components generate the low-pitched sound. Therefore, the above problem (A1) can be avoided by using the parametric speaker device.

It is noted that a low-pitched sound reproduced by the parametric speaker device has a longer wavelength; thus, a delay is caused in the self-demodulation in the air while even though it belongs to a low frequency wave, a strong directionality (i.e., having a strong tendency in advancing straight) is exhibited unlike a low-pitched sound reproduced by a dynamic speaker that directly emits or outputs an audible sound. This poses another problem A2. That is, as the frequency decreases, a sound pressure of a frequency, which a person perceives, decreases depending on the direction of an external ear (earhole) of the person in a region near the ultrasonic wave speaker of the parametric speaker device, as illustrated as a solid line A in FIG. 12.

The solid line A in FIG. 12 indicates a frequency characteristic under the condition that a sound detection section of a microphone is arranged in an inner portion of a dummy external ear in a dummy head (modeling after a head portion of a human being) and detects a reproduced sound by the parametric speaker device. In addition, the broken line B in FIG. 12 is a comparative line that indicates a frequency characteristic under the condition that a microphone directly detects a reproduced sound by the parametric speaker device without using a dummy head. The comparison between the solid line A and the broken line B shows a clear tendency of the decrease in the sound pressure perceived by a person in the low-pitched sound range due to the influence of the external ear with the decrease of the frequency.

Thus, in the case where the parametric speaker device is used, the following takes place. That is, due to the above problem A2, a shortage of the low-pitched sound arises in a false engine sound reproduced by the parametric speaker device in a vicinity of the vehicle. This provides a hindrance to the purpose of making the false engine sound using the parametric speaker device have frequency levels identical to those of the real engine sound.

Furthermore, when a notice sound having a larger sound pressure is emitted from the dynamic speaker mounted in the vehicle, a vehicle occupant who is in the vehicle continuously has to hear the notice sound emitted from the dynamic speaker for a long time depending on the sound pressure. Therefore, it is necessary to lower the sound pressure level audible to the vehicle occupant below the limit or threshold value (for example, 65 dB) of the vehicle occupant's sensitivity.

To that end, if reducing an output level of the dynamic speaker in order to lower a sound pressure of the notice sound which the vehicle occupant hears down to the limit of the vehicle occupant's sensitivity, the propagation distance of the notice sound becomes shorter, making it impossible to send the notice sound to the target propagation distance.

SUMMARY OF THE INVENTION

The present invention is made in view of the above problems.

It is a first object of the present invention to provide a vehicle presence notification apparatus which generates a false engine sound modeling for a real engine sound using a parametric speaker device without additionally mounting a large-sized cone vibrating plate typed dynamic speaker like a woofer excelling in reproduction of a low-pitched sound. The vehicle presence notification apparatus helps reduce a problem relative to the parametric speaker device having a tendency of losing a low-pitched sound in the false engine sound in a vicinity of the vehicle. The vehicle presence notification apparatus can generate a false engine sound modeling for a real engine sound.

It is a second object of the present invention to provide a vehicle presence notification apparatus that (i) generates a notice sound having a high sound pressure for a pedestrian existing at a short distance, (ii) transmits a notice sound to reach a pedestrian existing at a long distance, and (iii) lowers a sound pressure of a notice sound which a vehicle occupant such as a driver hears.

To achieve the above first object, according to a first example of the present invention, a vehicle presence notification apparatus that generates a false engine sound towards an outside of a vehicle is provided to report a presence of the vehicle. The vehicle presence notification apparatus uses: a parametric speaker device that emits ultrasonic waves, which are prepared by applying an ultrasonic wave modulation to a false engine sound, towards an outside of the vehicle; and a vehicular horn device, wherein an application of a direct-current self excitation voltage exceeding a threshold value produces an intermittence of a magnetic force to cause a moving iron core to vibrate; a vibrating plate connected to the moving iron core vibrates along with the moving iron core, so that the vehicular horn device generates an alarm sound. Here, the vehicle presence notification apparatus provides the vehicular horn device with an electrical signal, which configures a false engine sound with a separate excitation voltage lower than the self excitation voltage, causing the vehicular horn device to generate the false engine sound.

Here, the vehicular horn device is an existing electromagnetic type to output an alarm sound upon receiving a self excitation voltage. Under the above configuration, such a vehicular horn device is used or driven to generate a false engine sound upon receiving an electrical signal that configures the false engine sound due to a separate excitation voltage that is lower than the self excitation voltage. When the vehicular horn device of the electromagnetic type operates by a voltage less than the separate excitation voltage, the moving contact causing ON-OFF of a coil for generating a magnetic force is in contact with the fixed contact. Thus, a change in a magnetic force arises depending on the electrical signal configuring a false engine sound applied to the coil, so that the vibrating plate vibrates according to the electrical signal configuring the false engine sound along with the moving iron core, thereby generating a false engine sound. That is, providing the vehicular horn device with an electrical signal configuring a false engine sound due to the separate excitation voltage enables the vehicular horn device of the electromagnetic type to be used as a dynamic speaker for generating the false engine sound.

It is noted that the self excitation voltage or separate excitation voltage is differentiated from each other depending on the source of the excitation voltage. That is, a self excitation voltage is supplied to a dynamic speaker from an internal circuit contained in a subject device including the dynamic speaker; a separate excitation voltage is supplied to the dynamic speaker from an external circuit that is not contained in the subject device but contained in a different device or the like.

First Effect

Thus, the combination of the parametric speaker device and the vehicular horn device used as a dynamic speaker complements the shortage of the low-pitched sound in a vicinity of the vehicle mounting the parametric speaker device with the vehicular horn device serving as a dynamic speaker. Therefore, the vehicle need not mount a dynamic speaker using a large-sized cone type vibrating plate that is good at reproducing a low-pitched sound. Even in a range near the vehicle, while the shortage of the low-pitched sound of the false engine sound can be suppressed, the false engine sound can be generated so as to model for a real engine sound.

In addition, the vehicular horn device having an existing structure is used for complementing the shortage of the low-pitched sound pertinent to the parametric speaker device, thereby reducing costs and helping prevent a problem to be mounted in a vehicle. Furthermore, the vehicle presence notification apparatus uses or shares the vehicular horn device that is basically provided in a vehicle to output an alarm sound by a horn switch; thus, there is no need to additionally or separately mount a device or speaker in the vehicle so as to complement the shortage of the low-pitched sound, reducing costs and removing a need of securing a mounting space.

Second Effect

As a vehicle (or ultrasonic wave speaker) approaches a pedestrian, the low-pitched sound of a false engine sound by the vehicular horn device increases. In other words, as a vehicle approaches a pedestrian, the low-pitched sound reproduced by the vehicular horn device increases and the sound quality or sound tone of the false engine sound heard by the pedestrian varies. Thus, as the vehicle approaches the pedestrian, the low-pitched sound in the false engine sound increases to change the sound tone of the false engine sound; thus, the pedestrian easily notices the false engine sound, increasing a probability for the pedestrian to know the presence of the vehicle.

Further, to achieve the first object, according to a second example of the present invention, a vehicle presence notification apparatus that generates a false engine sound towards an outside of a vehicle is provided to report a presence of the vehicle. The vehicle includes a vehicular horn device of an electromagnetic type that generates an alarm sound by an application of a self excitation voltage on direct current exceeding a threshold voltage. The vehicle presence notification apparatus includes an ultrasonic wave speaker that emits, towards an outside of the vehicle, amplitude modulated ultrasonic waves to which an ultrasonic wave modulation is applied, the amplitude modulated ultrasonic waves undergoing a self-demodulation in air during propagating to generate an audible sound; and a notice sound controller that controls not only the ultrasonic wave speaker but also the vehicular horn device for generating a false engine sound in the outside of the vehicle. Here, the notice sound controller provides the ultrasonic wave speaker with amplitude modulated ultrasonic waves to which an ultrasonic wave modulation was applied to configure a false engine, causing the ultrasonic wave speaker to emit the amplitude modulated ultrasonic waves configuring the false engine sound, the false engine sound becoming audible in air during propagating; and the notice sound controller provides the vehicular horn device with an electrical signal, which configures a false engine sound with a separate excitation voltage lower than the self excitation voltage, causing the vehicular horn device to serve as a dynamic speaker to emit the false engine sound configured by the electrical signal, the false engine sound being emitted audible.

The second example can provide effects comparable to those of the first example.

To achieve the second object, according to a third example, a vehicle presence notification apparatus that announces a presence of a vehicle using a notice sound is provided as follows. The vehicle presence notification apparatus generates a notice sound towards an outside of the vehicle using a dynamic speaker that generates audible sonic waves depending on a magnetic force change accompanying a voltage change applied to a coil, and generates a notice sound towards an outside of the vehicle also using a parametric speaker device that emits ultrasonic waves which an ultrasonic wave modulation is applied to. Here, (i) in a short distance region that is close to the vehicle, the notice sound by the dynamic speaker and the notice sound by the parametric speaker device are combined to generate a notice sound with a high sound pressure; and (ii) in a long distance region that is farther than the short distance region with respect to the vehicle, the notice sound by the parametric speaker device is generated.

While a notice sound is generated towards an outside of the vehicle from the dynamic speaker, a notice sound is generated towards an outside of the vehicle also from the parametric speaker. The dynamic speaker excels in generating a sound at a shorter distance. The parametric speaker can transmit a sound at a longer distance.

The above configuration can provide the following. (a) In a short distance region close to the vehicle (e.g., 0 m to 5 m), a notice sound by the dynamic speaker and a notice sound by the parametric speaker are combined. Therefore, a composite notice sound with a higher sound pressure can be given to a nearby pedestrian existing in the short distance region. (b) In a long distance region distant from the vehicle (e.g., 5 m to 10), the notice sound emitted by the parametric speaker can be sent, therefore, delivering the notice sound to a pedestrian distantly existing. (c) With respect to the parametric speaker, emitted ultrasonic waves are self-demodulated in the air separated from the vehicle to transform into an audible sound; thus, the notice sound generated by the parametric speaker can be hardly heard by a vehicle occupant such as a driver. Therefore, although in the short distance region, the notice sound by the dynamic speaker and the notice sound by the parametric speaker are combined to generate a higher sound pressure. Since the vehicle occupant inside of the vehicle cannot easily hear the notice sound by the parametric speaker, the notice sound heard by the vehicle occupant can be reduced below the limit of the sensitivity of the vehicle occupant.

Thus, under the above vehicle presence notification apparatus can provide the following effects: (i) generating a notice sound having a high sound pressure for a pedestrian existing at a short distance; (ii) transmitting a notice sound to reach a pedestrian existing at a long distance; and (iii) lowering a sound pressure of a notice sound which a vehicle occupant such as a driver hears.

To achieve the second object, according to a fourth example, a vehicle presence notification apparatus that announces a presence of a vehicle using a notice sound is provided as follows. The vehicle presence notification apparatus includes: a dynamic speaker that emits towards an outside of the vehicle a notice sound configured by audible sonic waves that are generated depending on a magnetic force change accompanying a voltage change applied to a coil; an ultrasonic wave speaker that emits, towards an outside of the vehicle, amplitude modulated ultrasonic waves to which an ultrasonic wave modulation was applied, the amplitude modulated ultrasonic waves undergoing a self-demodulation in air during propagating to generate a notice sound being audible; and a notice sound controller that controls emitting of the dynamic speaker and the ultrasonic wave speaker such that: (i) in a short distance region that is close to the vehicle, the notice sound by the dynamic speaker and the notice sound by the ultrasonic wave speaker are audible, in combination, with a high sound pressure; and (ii) in a long distance region that is distant from the vehicle, the notice sound by the ultrasonic wave speaker is audible.

The fourth example can provide effects comparable to those of the third example.

BRIEF DESCRIPTION OF THE DRAWINGS

The above and other objects, features, and advantages of the present invention will become more apparent from the following detailed description made with reference to the accompanying drawings. In the drawings:

FIGS. 2A, 2B are cross-sectional views of examples of a vehicular horn device;

FIGS. 5A, 5B are diagrams illustrating each propagation distribution or region of a false engine sound;

DETAILED DESCRIPTION OF THE PREFERRED EMBODIMENTS

First Embodiment

Figure 1:
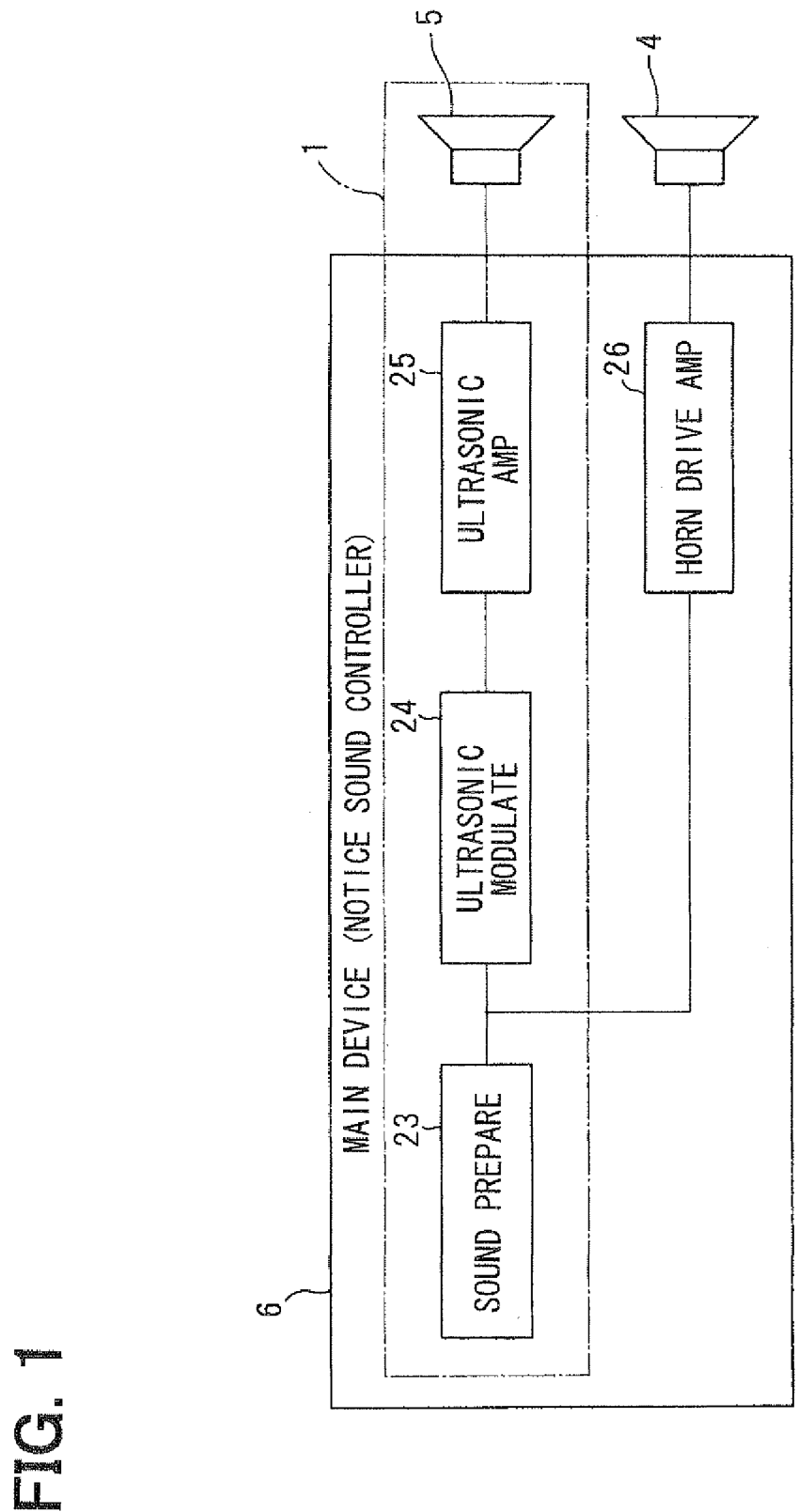
FIG. 1 is a schematic block diagram of a vehicle presence notification apparatus according to a first embodiment of the present invention.

A vehicular presence notification apparatus according to a first embodiment of the present invention will be explained with reference to drawings. The vehicle presence notification apparatus is mounted in a subject vehicle S so as to generate a false engine sound towards an outside of the vehicle S to announce a presence of the vehicle S in a vicinity of the vehicle S, i.e., so as to cause a person or pedestrian in the vicinity of the vehicle S to notice the presence of the vehicle S. The vehicle presence notification apparatus includes a parametric speaker device 1 which emits a modulated ultrasonic wave serving as a false engine sound towards an outside of the vehicle S. The vehicle presence notification apparatus further includes a vehicular horn device 4 serving as a dynamic speaker that directly outputs, as an audible sound, a notice sound such as a false engine sound.

Here, the vehicular horn device 4 is a general term of an alarm device or klaxon horn that is mounted in a vehicle to generate an alarm sound. The vehicular horn device 4 may include a vehicular alarm device that does not contain a horn member or a trumpet member. In specific, in the vehicular horn device 4, application of a direct-current self excitation voltage exceeding a threshold value (for example, 8V or more) produces an intermittence of the magnetic force to cause a moving iron core 2 to vibrate; a vibrating plate 3 (also referred to as a diaphragm 3) connected to the moving iron core 2 also vibrates along with the moving core 2, thereby generating or outputting an alarm sound. It is noted that, in the present embodiment, the vehicular horn device 4 is also provided with an electrical signal, which enables a generation of a false engine sound by applying a separate excitation voltage (for example, less than 8V) lower than a self excitation voltage; thereby, a false engine sound is also emitted from the vehicular horn device 4 serving as a dynamic speaker that directly outputs the false engine sound as an audible sound.

It is noted that the self excitation voltage or separate excitation voltage is differentiated from each other depending on the source of the excitation voltage. That is, a self excitation voltage is supplied to a dynamic speaker from an internal circuit contained in a subject device including the dynamic speaker; a separate excitation voltage is supplied to the dynamic speaker from an external circuit that is not contained in the subject device but contained in a different device or the like.

The vehicle presence notification apparatus according to the first embodiment will be explained with reference to FIGS. 1 to 10.

Configuration of First Embodiment

The vehicle presence notification apparatus of the first embodiment has a configuration illustrated in FIG. 1. The vehicle presence notification apparatus includes the following: a vehicular horn device 4 that is electromagnetic one having a conventional structure; an ultrasonic wave speaker 5 which emits an ultrasonic wave; and a main device 6 (also referred to as a notice sound controller 6) which performs an operation control for the vehicular horn device 4 and ultrasonic wave speaker 5.

(Explanation of Vehicular Horn Device 4)

The vehicular horn device 4 is an electromagnetic alarm sound generation device having a conventional structure to emit an alarm sound towards an outside of the vehicle. The vehicular horn device 4 is arranged, for instance, at an anterior portion of the vehicle S so as to emit an alarm sound outward of the vehicle S. Detailed examples of the vehicular horn device 4 will be explained with reference to FIG. 2A and FIG. 2B.

The vehicular horn device 4 is attached to the vehicle S via a stay 11 while including the following: a coil 12 which generates a magnetic force on electric current application; a fixed iron core (magnetic attraction core) 13 which generates a magnetic attraction power due to a magnetic force generated by the coil 12; a moving iron core (movable core) 2, which is supported by a central portion of a vibrating plate (i.e., diaphragm) 3 and is movable towards the fixed iron core 13; and a moving contact 15, which follows a movement of the moving iron core 2 and separates from a fixed contact 14 based on the movement of the moving iron core 2 towards the fixed iron core 13, thereby shutting down an electric current application to the coil 12.

Application of a direct current self excitation voltage equal to or greater than a threshold value (e.g., 8 V) to current application terminals of the vehicular horn device 4 enables the repetition of the following two movements in series: (i) an attraction movement for the moving iron core 2 to undergo a magnetic attraction towards the fixed iron core 13 due to a current application to the coil 12; and (ii) a restoration movement for the moving iron core 2 and the moving contact 15 to return based on the shutdown of the current application to the coil 12 due to the separation of the moving contact 15 away from the fixed contact 14.

Thus, such intermittent electric current application to the coil 12 (i.e., intermittent occurrence of the magnetic attraction power of the fixed iron core 13) causes the vibrating plate 3 as well as the moving iron core 2 to vibrate, resulting in the generation of an alarm sound from the vehicular horn device 4. In many cases, the vehicular horn device 4 is designed such that a fundamental pitch frequency of an alarm sound is set to a low frequency around 400 Hz. This enables a generation of a low frequency wave even if having a compact size. The frequency characteristic of an alarm sound (operating sound when the self excitation voltage is given) generated by the vehicular horn device 4 is illustrated in a solid line A in FIG. 3. As clearly understood from the solid line A in FIG. 3, the alarm sound (operating sound when the self excitation voltage is given) generated by the vehicular horn device 4 contains a fundamental pitch frequency (frequency set up due to intervals of ON-OFF of the moving contact 15) and its harmonic overtone frequencies.

In the vehicular horn device 4 of FIG. 2A, an alarm sound based on the vibration of the vibrating plate 3 is amplified by a horn member 16 (spiral trumpet member in FIG. 2A), emitting towards an outside of a vehicle. In addition, in the vehicular horn device 4 in FIG. 2B, an alarm sound based on the vibration of the vibrating plate 3 resonates a resonance plate 17 to generate a resonance sound, which amplifies the alarm sound, emitting towards an outside of a vehicle. The following uses as an example the vehicular horn device 4 equipped with the horn member 16 (trumpet member); however, there is no need thereto.

(Explanation of Ultrasonic Wave Speaker 5)

The ultrasonic wave speaker 5 is arranged at an anterior portion of the vehicle S so as to enable a generated ultrasonic wave to emit towards ahead of the vehicle S, similarly to the above vehicular horn device 4. Further, the ultrasonic wave speaker 5 is attached to a position which adjoins (is close to) the position of the vehicular horn device 4.

Figure 4A:
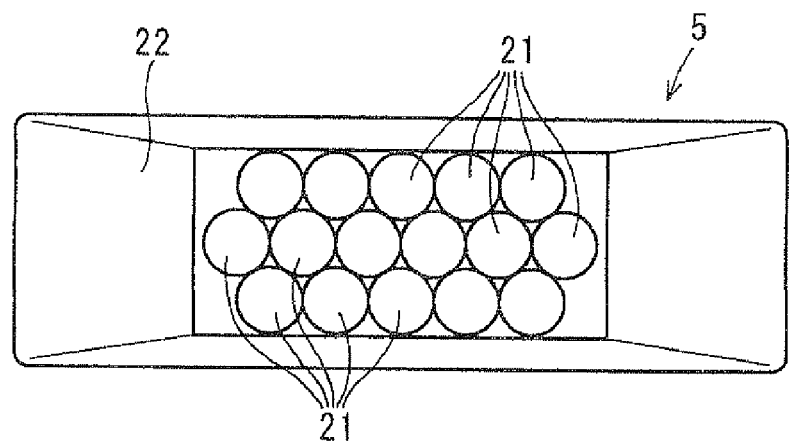
FIG. 4A is a front view of an ultrasonic wave speaker.
Figure 4B:
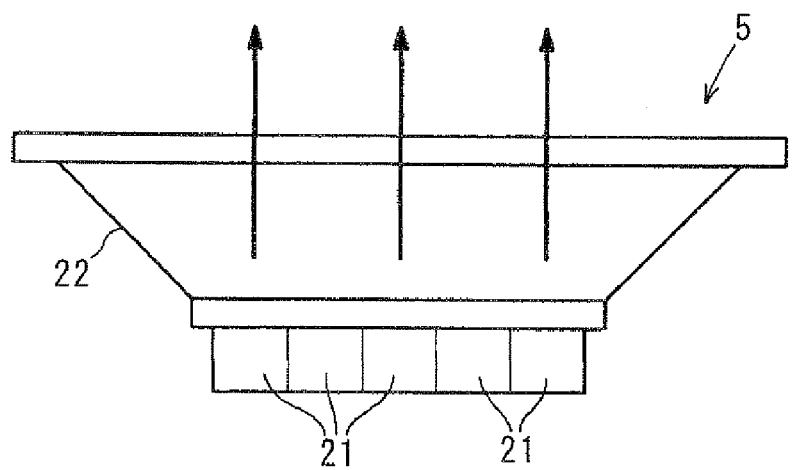
FIG. 4B is a top view of the ultrasonic wave speaker.

The detailed structure of the ultrasonic wave speaker 5 is illustrated in FIG. 4A and FIG. 4B. The structure of the ultrasonic wave speaker 5 illustrated in FIGS. 4A, 4B is only an example; there is no need to be limited thereto. The ultrasonic wave speaker 5 is an ultrasonic generation device to generate an aerial vibration of a frequency (not less than 20 kHz) higher than a human being's audible region. In the present embodiment, the ultrasonic wave speaker 5 is provided such that several piezoelectric speakers 21 (i.e., ceramic speakers) 21 are arranged so as to serve as a speaker array. The piezoelectric speaker 21 has a known structure to contain a piezoelectric element that is extended and contracted according to an applied voltage (charge and discharge), and a vibrating plate which gives vibrations to the air depending on expansion and contraction of the piezoelectric element.

The ultrasonic wave speaker 5 is controlled with respect to the amount of energy of the ultrasonic wave to generate and the directionality region of the ultrasonic wave emitted from the piezoelectric speakers 21 depending on the arrangement and the number of the piezoelectric speakers 21 in use. In addition, the directionality region of the ultrasonic wave may be controlled by using a directionality control member 22 (i.e., horn member) illustrated in FIGS. 4A, 4B. In the present embodiment, the piezoelectric speaker 21 is used as an example of a speaker which generates an ultrasonic wave. Without need to be limited to the above, another may be adopted as long as the ultrasonic wave can be reproduced.

FIG. 5A illustrates a propagation region α of a false engine sound generated by the parametric speaker device 1; FIG. 5B illustrates a propagation region β of a false engine sound generated by the vehicular horn device 4. In FIGS. 5A, 5B, the propagation regions are illustrated with respect to the false engine sound having a sound pressure of 50 dB. Thus, the ultrasonic wave speaker 5 of the present first embodiment is provided so as to emit or radiate an ultrasonic wave towards a front area ahead of the vehicle S. In addition, the vehicular horn device 4 is provided so as to emit or radiate a false engine sound to reach evenly a circumferential circular line of the vehicular horn device 4 itself in a top view of the vehicle S. For instance, the horn member 16 of the vehicular horn device 4 is arranged such that an opening is directed at downward of the vehicle S (in a direction facing a road surface). It is noted that the direction of the opening of the horn member 16 need not be limited to the above.

(Explanation of Main Device or Notice Sound Controller 6)

The following will explain the main device or notice sound controller 6 to cause the vehicular horn device 4 and the ultrasonic wave speaker 5 to generate a false engine sound. The configuration of the main device 6 is only an example; there is no need to be limited thereto. With reference to FIG. 1, the main device 6 includes the following: (a) a false engine sound preparation portion 23 to prepare a frequency signal which configures or generate a false engine sound; (b) an ultrasonic amplitude modulation portion 24 to modulate a frequency signal of the false engine sound into ultrasonic frequencies; (c) an ultrasonic wave speaker amplifier 25 to drive the ultrasonic wave speaker 5 using the modulated ultrasonic frequencies; and (d) a horn driving amplifier 26 (power amplifier) to drive the vehicular horn device 4 using the frequency signal of the false engine sound (electrical signal which configures the false engine sound). The main device 6 operates by receiving an operating signal (a generation instruction signal for a false engine sound), for example from an engine control unit.

In addition, the main device 6 includes a power supply portion, which is connected to an in-vehicle power source (not shown) such as an in-vehicle battery to supply an electric power necessary for an operation of each circuit (electric functional component) contained in the main device 6. It is noted that the main device 6 may include another function such as an automatic adjusting means or module (not shown) to adjust automatically sound output levels (sound volumes) of the vehicular horn device 4 and the ultrasonic wave speaker 5 based on an ambient noise surrounding the vehicle S or a vehicle speed of the vehicle S.

The above portions (a)-(d) of the main device 6 will be explained below.

(Explanation of False Engine Sound Preparation Portion 23)

The false engine sound preparation portion 23 includes a known computer containing a CPU which performs data processing, a storage module or means (memory) to store a program, an input circuit, and an output circuit. The storage module stores an engine sound preparation program (a sounding software program) which prepares an electrical signal which configures a false engine sound using a digital processing technique.

An example of the engine sound preparation program will be explained. The following engine sound preparation program is only an example; there is no need to be limited thereto. The engine sound preparation program of the present embodiment prepares a frequency signal (waveform signal) which configures a false engine sound based on a clock signal generated by a reference clock (crystal oscillator) contained in the computer. That is, (i) a selection frequency A Hz is selected from frequencies (for example, between 1 Hz and 10 Hz); and (ii) several frequencies in the frequency signal are designated in series with intervals of the selection frequency A Hz and simultaneously generated to prepare a false engine sound.

A specific example is explained which uses a fixed selection frequency A Hz of 4 Hz. It is noted that "4 Hz" is a only an example, "8 Hz" of twice 4 Hz may be substituted for 4 Hz. Alternatively, another fixed selection frequency may be designated which may contain a decimal point (for example, a frequency selected from "3.5 Hz-4.5 Hz" or "7.5 Hz-8.5 Hz"). In addition, in the present embodiment, the frequency signal configuring a false engine sound contains a large number of frequencies (i.e., frequency elements) which are designated with intervals of "A Hz (4 Hz)" as mentioned above. There is no need to be limited thereto. For instance, from the many frequency elements of the frequency signal configuring a false engine sound, part of them may be thinned out. That is, in the frequency signal, some of the frequency elements designated with the 4 Hz intervals are removed partially.

In contrast, the engine sound preparation program includes a frequency range designation module or means (program), which generates a frequency signal containing a number of frequency elements with 4 kH intervals in series (frequency signal which configures a false engine sound) only within a predetermined frequency range. The following is an example of the predetermined frequency range on premise that the frequency characteristic of a real engine sound exhibits a characteristic of a solid line E in (a) in FIG. 6. The frequency range of the engine sound which people's ears hear is a main frequency range L (frequency range within Δ10 dB) down to the sound pressure lowered by 10 dB from a maximum sound pressure. The sound outside of the main frequency range L (sound with a low sound pressure) is masked by the sound of the main frequency range L and noticed hardly.

Therefore, the engine sound preparation program uses such a state where only the main frequency range L of the engine sound can be heard for a human being's ear. That is, as illustrated in (b) of FIG. 6, a large number of frequency elements with intervals of 4 kH of a frequency signal (frequency signal configuring a false engine sound) are generated only within the main frequency range L.

The specific explanation will be made as follows. When a false engine sound is intended to model after a real engine sound of a specific type of vehicle, the real engine sound of the specific type of vehicle is measured. The measurement is made for a frequency range from a maximum sound pressure down to a sound pressure lower by 10 dB. Such a frequency range corresponds to the main frequency range L mentioned above. The main frequency range L accords mostly with the frequency range (about 4 Hz-250 kHz) where a human being has a high degree of sensitivity. Therefore, as illustrated in (b) of FIG. 6, the engine sound preparation program is provided such that a frequency signal configuring a false engine sound is generated only within the main frequency range L between 250 Hz and 4 kHz.

Furthermore, the engine sound preparation program includes a frequency characterization module or means, which processes preparation of a frequency characteristic of the frequency signal (frequency signal which configures or generates the false engine sound) containing a large number of frequency elements in series with intervals of 4 Hz.

Figure 6:
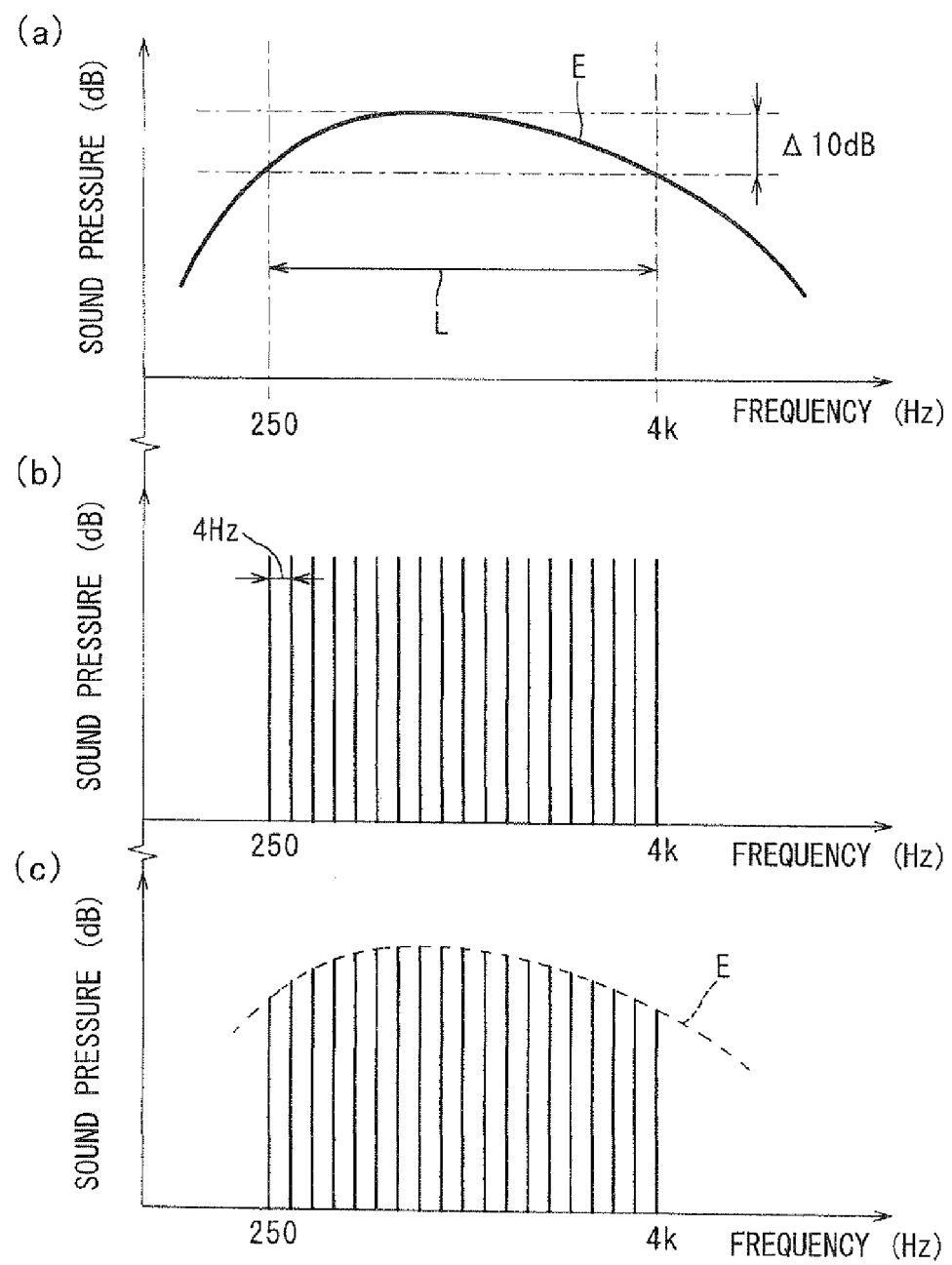
FIG. 6 is a diagram for explaining a false engine sound.

Modeling a false engine sound after the real engine sound of the specific type of vehicle may result in exhibiting a characteristic of the solid line E in (a) in FIG. 6. In such a case, in order to accord with the frequency characteristic of the specific type of vehicle (the characteristic of the solid line E in (a) of FIG. 6), the preparation of the frequency characteristic of the frequency signal configuring the false engine sound (i.e., the preparation of the sound pressures of respective frequency elements) is processed to have the broken line E in (c) of FIG. 6.

(Explanation of Ultrasonic Amplitude Modulation Portion 24)

The ultrasonic amplitude modulation portion 24 includes an ultrasonic wave oscillator which can oscillate an ultrasonic frequency (i.e., a frequency exceeding 20 kHz such as 25 kHz). The ultrasonic wave oscillator modulates a variation in increase and decrease of the voltage of the waveform signal (electrical signal configuring the false engine sound) outputted by the false engine sound preparation portion 23 into an amplitude variation in the oscillating voltage of the ultrasonic frequency. For easy understanding, the present embodiment indicates that the ultrasonic amplitude modulation portion 24 is provided to be an independent portion. There is no need to be limited thereto. The ultrasonic amplitude modulation portion 24 may be integrated into a program of the computer.

Figure 7:
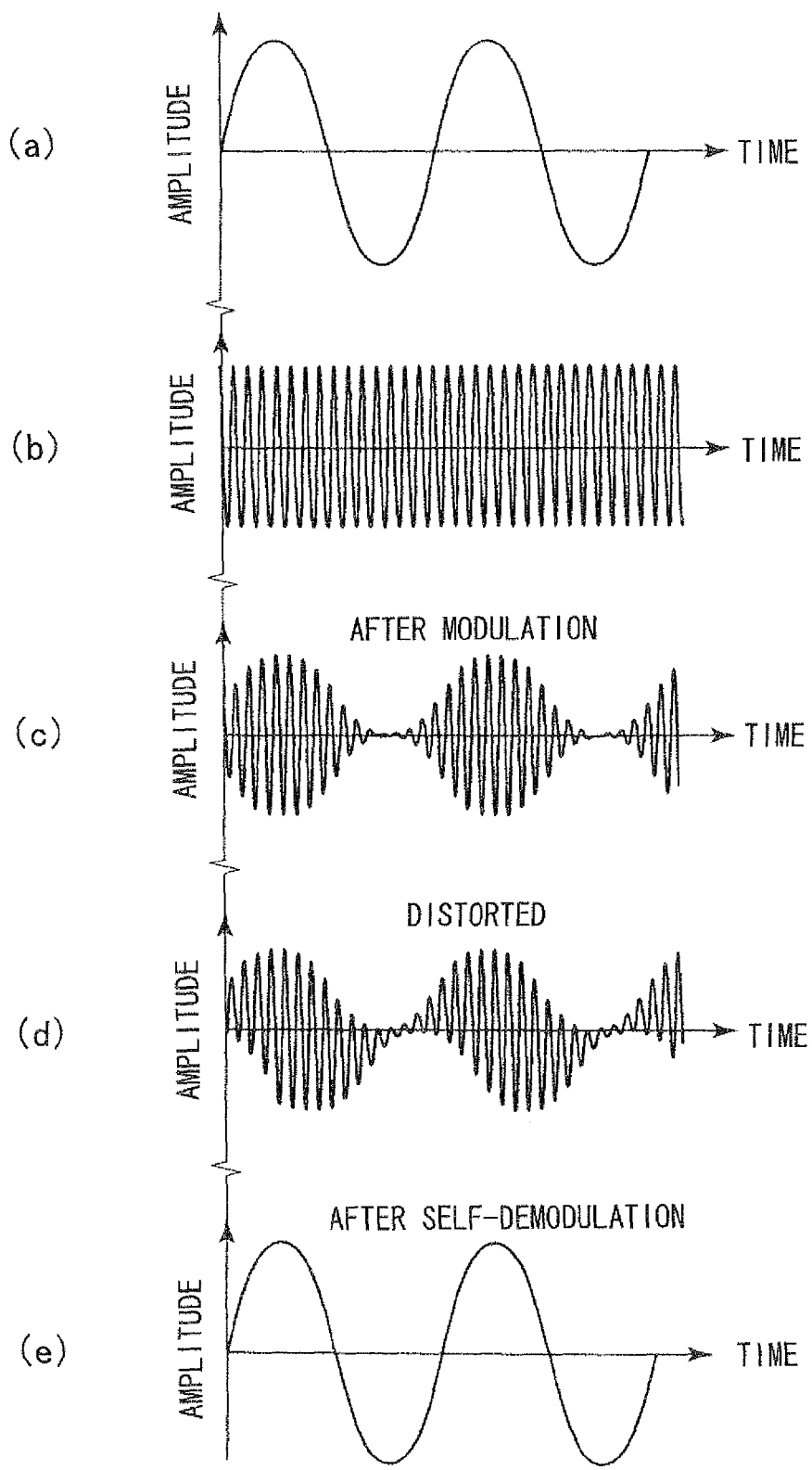
FIG. 7 is a diagram for explaining a principle of a parametric speaker device.

With reference to FIG. 7, the following will explain an ultrasonic modulation by the ultrasonic amplitude modulation portion 24; the ultrasonic modulation signifies modulation of a frequency signal configuring a false engine sound into an amplitude variation in oscillating voltage. For example, the following is on the premise that the ultrasonic amplitude modulation portion 24 inputs a frequency signal configuring a false engine sound which exhibits a voltage change illustrated in (a) of FIG. 7. Here, the drawing illustrates a waveform of a single frequency for easy understanding; an actual waveform contains a composite of several frequencies (i.e., frequency elements) with intervals of 4 Hz. In contrast, the ultrasonic wave oscillator contained in the ultrasonic wave amplitude modulation portion 24 oscillates on the ultrasonic frequency illustrated in (b) of FIG. 7.

Then, as illustrated in (c) of FIG. 7, the ultrasonic amplitude modulation portion 24 operates as follows: (i) depending on the increase of the voltage of the frequency signal configuring a false engine sound, an amplitude of the voltage due to the ultrasonic vibration is enlarged; and (ii) depending on the decrease of the voltage of the frequency signal configuring a false engine sound, an amplitude of the voltage due to the ultrasonic vibration is reduced. Thus, the ultrasonic amplitude modulation portion 24 modulates the frequency signal configuring a false engine sound inputted from the false engine sound preparation portion 23 into the amplitude change in oscillating voltage of the ultrasonic frequency.

The ultrasonic amplitude modulation portion 24 in the present embodiment transforms the variation in the voltage of the frequency signal configuring a false engine sound into the amplitude of the voltage illustrated in (c) of FIG. 7. Without need to be limited thereto, unlike (c) of FIG. 7, another may be adopted. For instance, the variation in the voltage of the frequency signal configuring a false engine sound may be transformed into the width of the occurrence duration of the voltage by using a technology of the PWN modulation.

(Explanation of Ultrasonic Wave Speaker Amplifier 25)

The ultrasonic wave speaker amplifier 25 drives each piezoelectric speaker 21 based on the ultrasonic signal which is prepared by applying an amplitude modulation to the frequency signal configuring a false engine sound (i.e., an output signal of the ultrasonic amplitude modulation portion 24). The control of the voltage applied to each piezoelectric speaker 21 (charge and discharge state) enables each piezoelectric speaker 21 to generate an ultrasonic wave, which is prepared by applying an amplitude modulation to the frequency signal configuring the false engine sound. A specific example is as follows. The ultrasonic wave speaker amplifier 25 is an electric charge switching circuit (i.e., a charging and discharging circuit of the piezoelectric element) which applies voltages by switching between a positive voltage and a negative voltage to each piezoelectric speaker 21. When the waveform signal illustrated in (c) of FIG. 7 is given to the ultrasonic wave speaker amplifier 25 from the ultrasonic amplitude modulation portion 24, the ultrasonic wave speaker amplifier 25 provides the ultrasonic wave speaker 5 with a waveform voltage illustrated in (c) of FIG. 7, causing each piezoelectric speaker 21 to generate the ultrasonic wave having an output wave illustrated in (c) of FIG. 7.

(Explanation of Horn Driving Amplifier 26)

The horn driving amplifier 26 is a power amplifier (power amplification circuit) for operating the vehicular horn device 4 so as to serve as a dynamic speaker. The horn driving amplifier 26 amplifies the increase and decrease of the change in the voltage of the waveform signal (electrical signal configuring a false engine sound), which the false engine sound preparation portion 23 outputs, to give to the current application terminals (terminals connected to both ends of the coil 12) of the vehicular horn device 4. The maximum output (maximum output for generating a false engine sound) of the horn driving amplifier 26 is restricted to less than 8V (separate excitation voltage), such that a voltage output for generating the false engine sound cannot not generate an alarm sound in the vehicular horn device 4.

Operation of First Embodiment

The operation of the vehicle presence notification apparatus of the first embodiment will be explained. The vehicle presence notification apparatus mentioned above is operated by an event that an operating signal is given from an engine control unit (i.e., ECU), for example. The vehicle presence notification apparatus may be operated as follows: (i) being operated constantly during the traveling of the vehicle S (for example, during the travel in the heading direction); (ii) being operated only in cases that the travel speed of the vehicle S is within a predetermined speed range; and (iii) being operated only in cases that during the travel of the vehicle S, a presence of a person ahead of the vehicle S is confirmed by a person recognition system (not shown).

When the vehicle presence notification apparatus operates, the ultrasonic wave speaker 5 emits ultrasonic waves (sonic waves which cannot be heard) which are generated by applying an amplitude modulation to a signal wave form of a false engine sound, as illustrated in (c) of FIG. 7. As illustrated in (d) of FIG. 7, as the ultrasonic waves propagate in the air, the ultrasonic waves having a short wavelength are distorted and smoothed by virtue of the viscosity of the air, etc. As illustrated in (e) of FIG. 7, the amplitude components contained in the ultrasonic waves undergo the self-demodulation during the propagating in the air, resulting in generating a false engine sound at a position distant from the output source (i.e., the vehicle S mounting the ultrasonic wave speaker 5) of the ultrasonic waves.

In addition, when the vehicle presence notification apparatus operates, an electrical signal with the separate excitation voltage is provided to the vehicular horn device 4 for generating a false engine sound. In the vehicular horn device 4 of an electromagnetic type, under the voltage equal to or less than the separate excitation voltage, the moving contact 15 is in contact with the fixed contact 14, causing the coil 12 to be an energized state. When the electrical signal configuring a false engine sound is provided to the coil 12 of the vehicular horn device 4, the magnetic force change thereby arises depending on the electrical signal configuring a false engine sound, so that the moving iron core 2 and the vibrating plate 3 vibrate according to the electrical signal configuring a false engine sound. Thus, the vehicular horn device 4 of a electromagnetic type can be used as a dynamic speaker; the false engine sound can be generated from the vehicular horn device 4.

Figure 3:
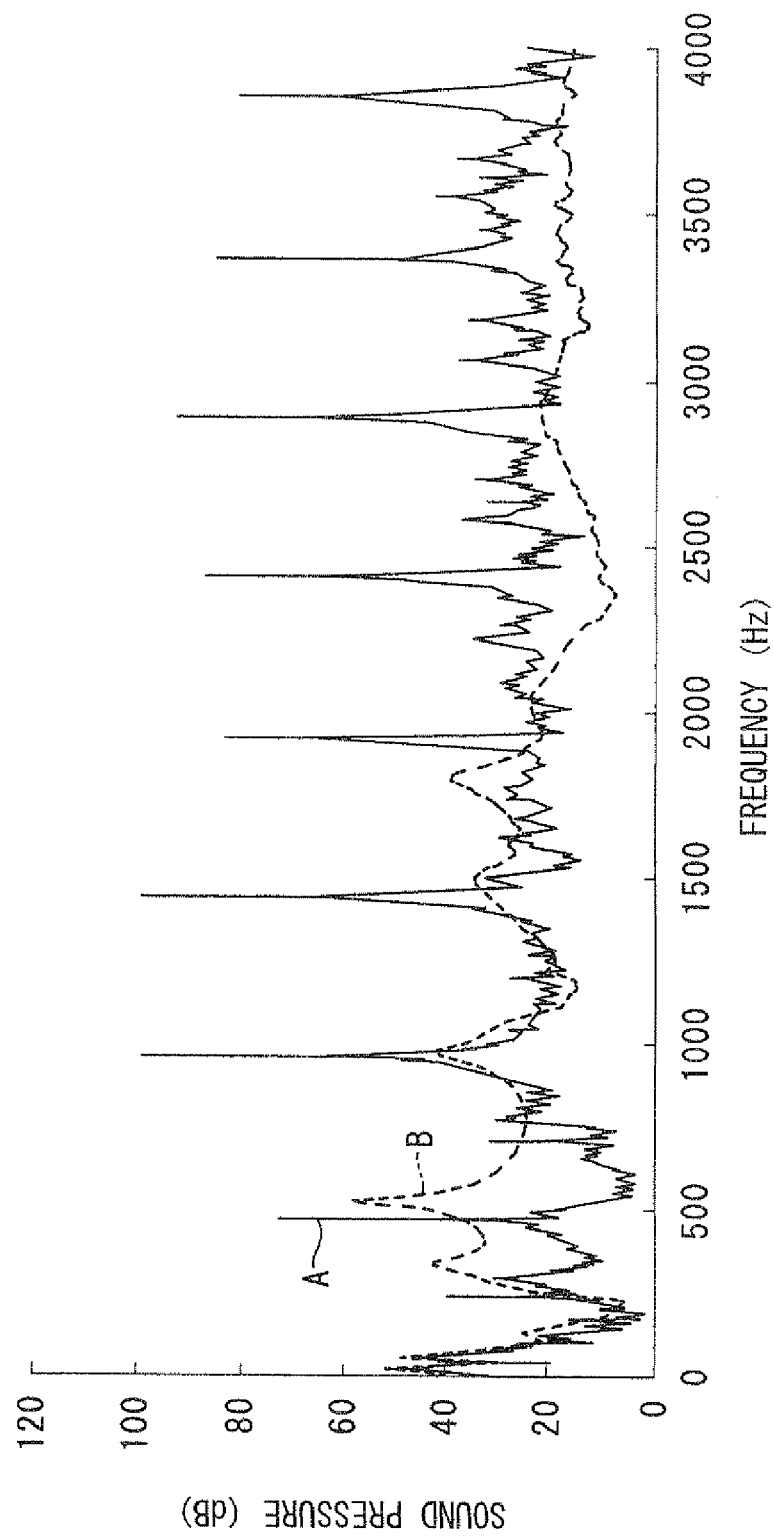
FIG. 3 is a diagram illustrating a frequency characteristic of the vehicular horn device in cases of applying self excitation voltage and separate excitation voltage.

The frequency characteristic of the vehicular horn device 4 in case of using the vehicular horn device 4 as a dynamic speaker is illustrated in a broken line B in FIG. 3. This broken line B is a frequency characteristic in case that a sweep signal (a variable signal from a low frequency to a high frequency) of a sine wave of 1V is provided to the vehicular horn device 4. As clearly understood from the broken line B in FIG. 3, while the vehicular horn device 4 can be used as a dynamic speaker, the low-pitched sound range of 800 Hz or less can be reproduced. In particular, the high reproductive capability is read in the low-pitched sound around 300 Hz and 500 Hz.

[Effect 1 of First Embodiment]

In the vehicle presence notification apparatus of the first embodiment, the parametric speaker device 1 and the vehicular horn device 4 used as a dynamic speaker are combined, so that the shortage of the low-pitched sound in a vicinity of the vehicle S which the parametric speaker device 1 provides can be supplemented with the vehicular horn device 4 used as a dynamic speaker.

Figure 8:
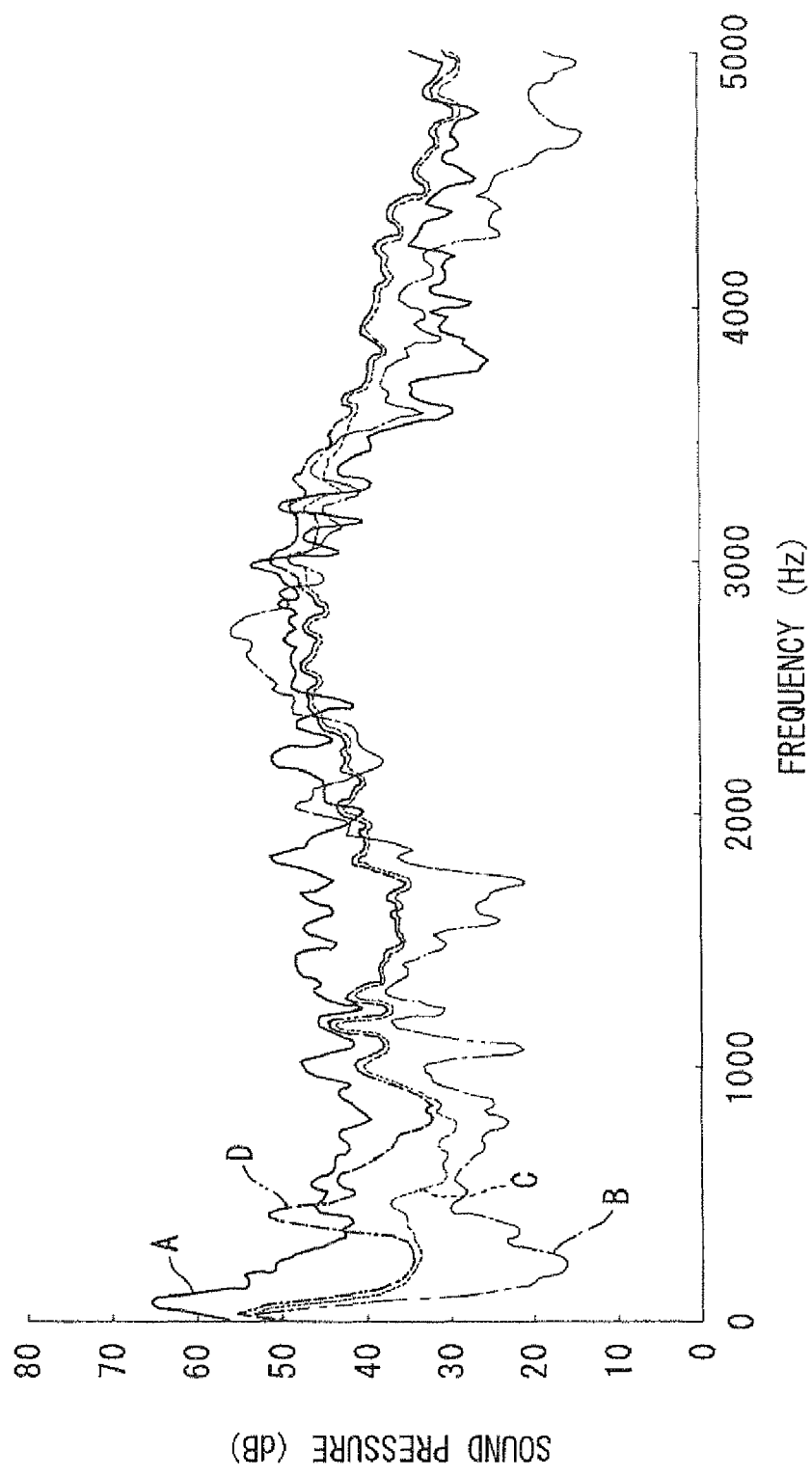
FIG. 8 is a diagram illustrating frequency characteristics of a real engine sound, a false engine sound by a corn type dynamic speaker, a false engine sound by a parametric speaker device, and a composite false engine sound by both a parametric speaker device and a vehicular horn device on separate excitation.

A specific explanation will be made with reference to FIG. 8. It is noted that each characteristic of FIG. 8 is measured using a dummy head at a distance of 1 m from a sound source. The solid line A of FIG. 8 illustrates a frequency characteristic of a real engine sound. The one-dot chain line B of FIG. 8 illustrates a frequency characteristic of the corn type dynamic speaker (small speaker whose diameter of the corn is 10 cm in consideration of the installation in a vehicle), which reproduces a false engine sound which the false engine sound preparation portion 23 prepares. The broken line C of FIG. 8 illustrates a frequency characteristic of the parametric speaker device 1 which reproduces a false engine sound which the false engine sound preparation portion 23 prepares. The two-dot chain line D of FIG. 8 illustrates a frequency characteristic of the combination of the vehicular horn device 4 under the separate excitation and the parametric speaker device 1, both of which reproduce a false engine sound prepared by the false engine sound preparation portion 23.

The comparison between the solid line A and the one-dot chain line B in FIG. 8 clearly exhibits that the corn type dynamic speaker (small speaker whose diameter of the corn is 10 cm) reproduces 2 kHz or less weak, causing the false engine sound to run short in the middle-pitched sound range and the low-pitched sound range. Here, a possible use of the dynamic speaker with a large-sized cone type vibrating plate 3 such as a woofer results in the increase of costs, the increase of the weight, and the difficulty in installation in a vehicle.

The comparison between the solid line A and the broken line C in FIG. 8 clearly exhibits that the parametric speaker device 1 provides, in a vicinity of the vehicle S (or ultrasonic wave speaker 5), the false engine sound such that the low-pitched sound range is in an insufficient state. Further, as illustrated clearly from the two-dot chain line D, when (i) the false engine sound by the parametric speaker device 1 that provides at a short distance from the sound source a low-pitched sound range in an insufficient state, and (ii) the false engine sound by the vehicular horn device 4 that can reproduce well at a short distance from the sound source a low-pitched sound range are combined, such a combination enables the generation of the false engine sound modeling for the real engine sound in a wide range of 4 Hz-250 kHz.

That is, the combination of the parametric speaker device 1 and the vehicular horn device 4 used as a dynamic speaker enables the shortage of the low-pitched sound in a vicinity of the vehicle S which the parametric speaker device 1 holds to be supplemented with the vehicular horn device 4 used as a dynamic speaker. Even if a distance between the vehicle S and a pedestrian is small, the false engine sound can be generated so as to model for the real engine sound in a wide range of 4 Hz-250 kHz.

[Effect 2 of First Embodiment]

In the vehicle presence notification apparatus according to the present first embodiment, as the vehicle S (or ultrasonic wave speaker 5) approaches a pedestrian, the low-pitched sound of the false engine sound by the vehicular horn device 4 increases. Thus, as the vehicle S approaches the pedestrian, the low-pitched sound reproduced by the vehicular horn device 4 increases, which changes the sound tone or sound quality of the false engine sound which the pedestrian hears.

Figure 9:
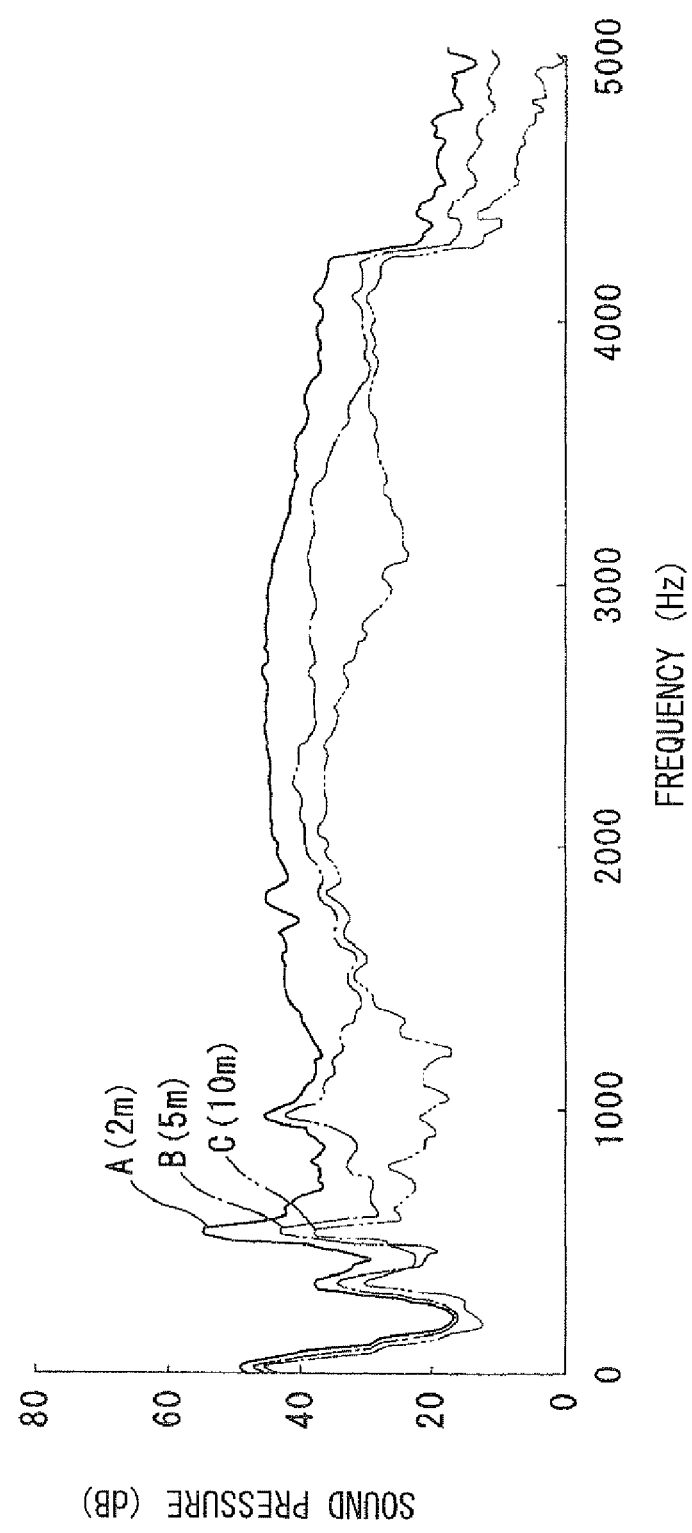
FIG. 9 is a diagram illustrating frequency characteristics of a false engine sound depending on several distances to a pedestrian from a vehicle.

A specific explanation will be made with reference to FIG. 9. FIG. 9 illustrates each frequency characteristic obtained by measuring a false engine sound using a dummy head; the false engine sound is generated by the false engine sound preparation portion 23 and reproduced by both the parametric speaker device 1 and the vehicular horn device 4. The solid line A of FIG. 9 illustrates a false engine sound frequency characteristic at a distance of 2 m between the sound source and the measurement portion. The one-dot chain line B of FIG. 9 illustrates a false engine sound frequency characteristic at a distance of 5 m between the sound source and the measurement portion. The two-dot chain line C of FIG. 9 illustrates a false engine sound frequency characteristic at a distance of 10 m between the sound source and the measurement portion.

The comparison among the solid line A (2 m), the one-dot chain line B (5 m), and the two-dot chain line C (10 m) exhibits the following: as the vehicle S (ultrasonic wave speaker 5) approaches a pedestrian, the influence of the false engine sound by the vehicular horn device 4 increases, so the sound pressure of the low-pitched sound range (in particular, the sound pressure around 500 Hz) increases. Thus, when the vehicle S approaches the pedestrian, the low-pitched sound reproduced by the vehicular horn device 4 increases, which changes the sound tone of the false engine sound which the pedestrian hears. The false engine sound can be thus easily noticed by the pedestrian, enabling the presence of the vehicle to be recognized by the pedestrian with a high probability.

[Effect 3 of First Embodiment]

Figure 10B:
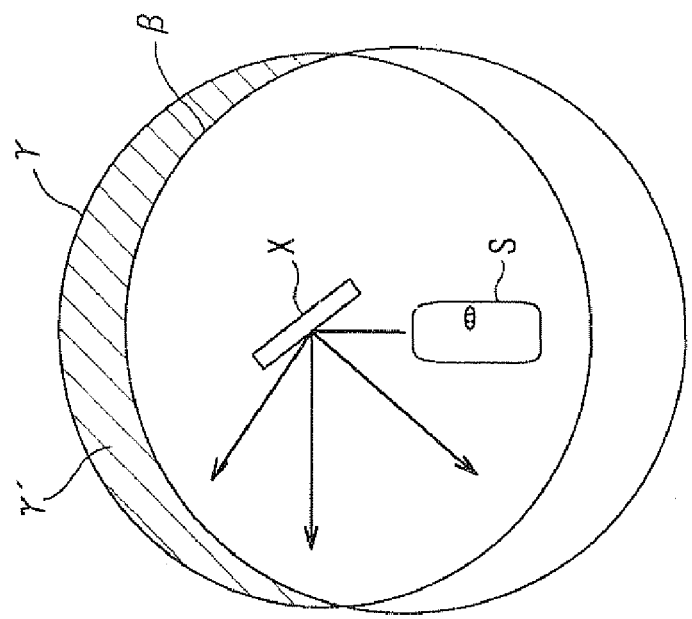
FIG. 10B is a diagram for explaining a region where an erroneous recognition arises due to a reflection of an ultrasonic wave and a propagation region of a false engine sound by the vehicular horn device.
Figure 10A:
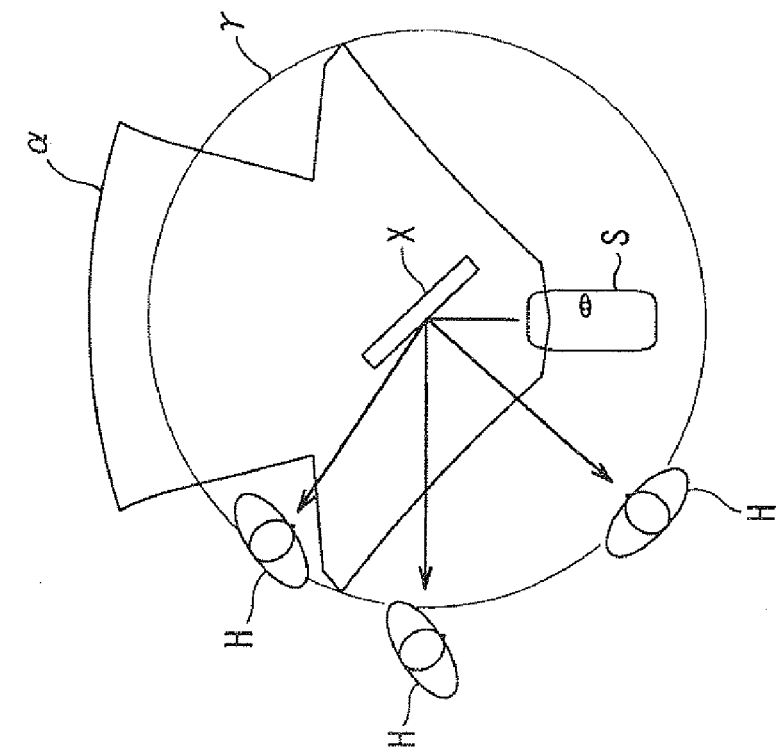
FIG. 10A is a diagram for explaining a propagation region of a false engine sound by the parametric speaker device, and a region where an erroneous recognition arises due to a reflection of an ultrasonic wave.

The false engine sound by the parametric speaker device 1 has a strong tendency to advance straight. Thus, as illustrated in FIG. 10A, in the propagation region α of a false engine sound by the parametric speaker device 1, when the ultrasonic wave is reflected by a reflecting object X (for example, a signboard) existing in a sidewalk etc., a pedestrian H hears a false engine sound from a direction different from the direction of the vehicle S. That is, the erroneous recognition by the reflection of the ultrasonic wave arises in the range (the region γ where the erroneous recognition is produced by the reflection of the ultrasonic wave) in FIG. 10A.

In order to solve this problem, in the present first embodiment, the vehicular horn device 4 and the ultrasonic wave speaker 5 in the parametric speaker device 1 are arranged adjacently (close to each other). The adjacent arrangement between the vehicular horn device 4 and the ultrasonic wave speaker 5 results in enlarging an overlap region of (i) the region γ where the erroneous recognition is produced by the reflection of the ultrasonic wave and (ii) the propagation region β of the false engine sound by the vehicular horn device 4.

Further, in such an overlap region of the region γ and the propagation region β, the pedestrian hears also the false engine sound by the vehicular horn device 4, suppressing the erroneous recognition by the reflection of the ultrasonic wave. This can reduce the region γ' (hatching area in FIG. 10B) where the erroneous recognition may be substantively produced by the reflection of the ultrasonic wave, suppressing the erroneous recognition by the reflection of the ultrasonic wave.

[Effect 4 of First Embodiment]

The vehicle presence notification apparatus according to the present first embodiment generates a false engine sound using the vehicular horn device 4 as a dynamic speaker. Therefore, the false engine sound by the vehicular horn device 4 can reach a region behind the vehicle S where the false engine sound by the parametric speaker device 1 does not reach easily. Therefore, when the vehicle S goes back, the false engine sound noticed behind the vehicle S can notify the pedestrian at the back of the vehicle S of the presence of the vehicle S.

[Effect 5 of First Embodiment]

The vehicular horn device 4 of the first embodiment is provided such that when an occupant of the vehicle S turns on a horn switch, the self-excitation voltage is supplied to generate an alarm sound. That is, the vehicular horn device 4 of the first embodiment serves as both the vehicular horn device 4 which generates an alarm sound and the vehicular horn device 4 which generates a false engine sound. That is, combining of both a vehicular horn device 4 which generates an alarm sound and a vehicular horn device 4 which generates a false engine sound enables suppression in costs of the vehicle presence notification apparatus while making easier securing of the mount space of the vehicular horn device 4 which generates a false engine sound.

Modification of First Embodiment

A modification of the first embodiment will be explained with reference to FIG. 11. The modification of the first embodiment provides an ultrasonic directionality extension portion or means (expander). When a travel speed of the vehicle S is below a predetermined speed (at a slow vehicle speed), the ultrasonic directionality extension portion extends the directionality of the ultrasonic wave (directionality on a horizontal plane in the heading direction of the vehicle S), which the ultrasonic wave speaker 5 generates.

Figure 11:
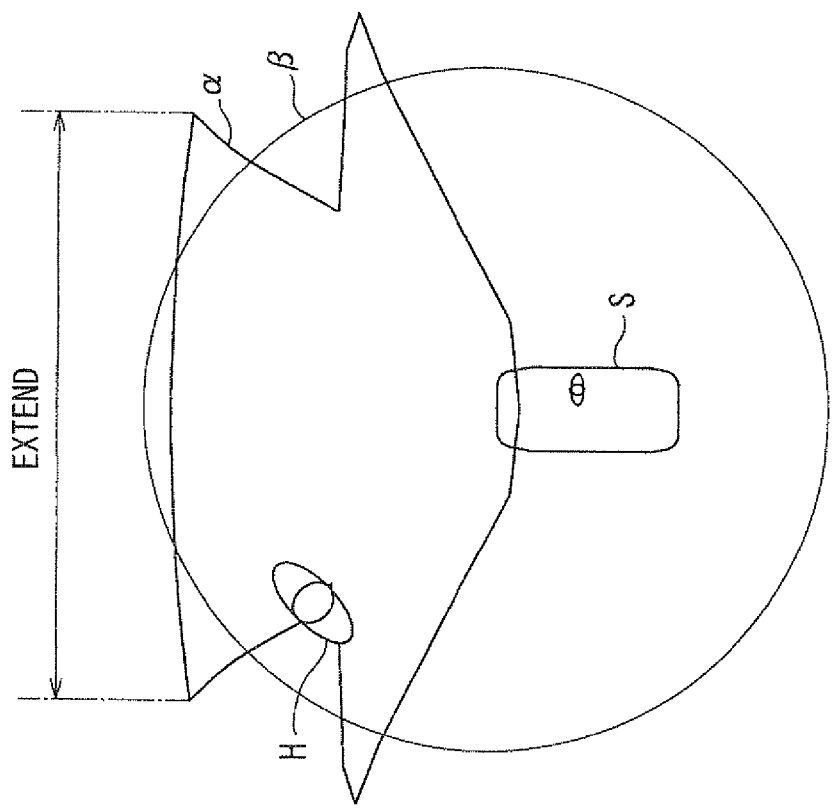
FIG. 11 is a diagram illustrating a propagation region of a false engine sound by the parametric speaker device at a slow vehicle speed, a propagation region of a false engine sound by the vehicular horn device at a slow vehicle speed, and a region where an erroneous recognition arises due to a reflection of an ultrasonic wave at a slow vehicle speed according to a modification of the first embodiment.
Figure 12:
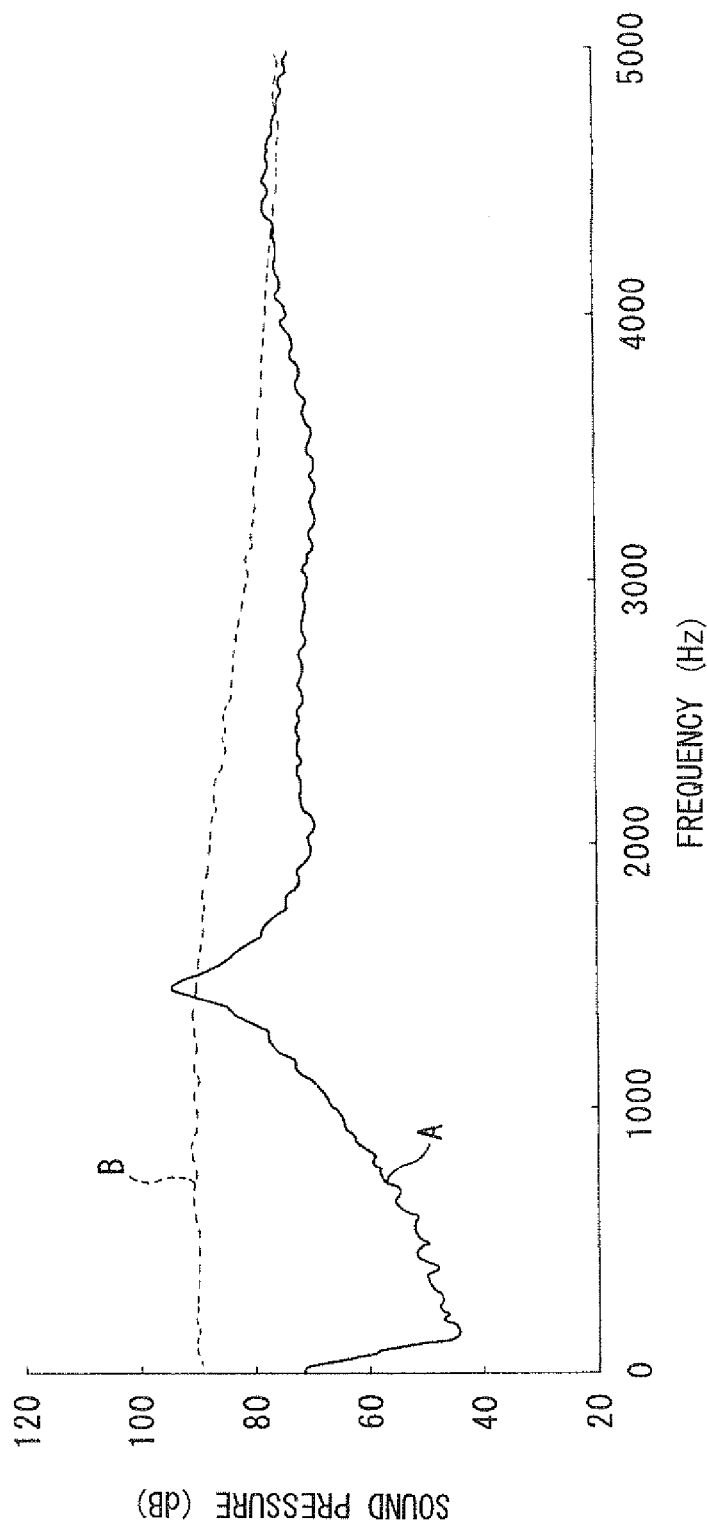
FIG. 12 is a diagram for explaining a frequency characteristic for a low-pitched sound range of the parametric speaker device to decrease due to an influence of an external ear.

As illustrated in FIG. 11, the ultrasonic directionality extension portion extends a propagation region α of a false engine sound by the parametric speaker device 1 at a slow vehicle speed as compared with that in FIG. 10A of the first embodiment. (i) The propagation region α of the ultrasonic wave may be extended using several auxiliary piezoelectric speakers 21 arranged in an oblique direction on either right side and the left side with respect to the heading direction of the vehicle S. (ii) The emission direction of the ultrasonic wave of the ultrasonic wave speaker 5 may be inclined in the direction of a road surface using an actuator (solenoid etc.), thereby intending a diffusion of the ultrasonic wave on the road surface. (iii) An acoustic lens provided in the emission direction of the ultrasonic wave of the ultrasonic wave speaker 5 is displaced with an actuator (solenoid etc.), intending a diffusion of the ultrasonic wave. That is, the ultrasonic directionality extension portion is not limited and can be changed suitably.

The vehicle presence notification apparatus according to the present modification of the first embodiment enlarges the propagation region α of a false engine sound by the parametric speaker device 1 at the slow vehicle speed, thereby generating the false engine sound for a pedestrian H in a wider region. The notification region of the vehicle S at the slow vehicle speed can be extended.

In addition, when the ultrasonic directionality extension portion extends the propagation region α of a false engine sound by the parametric speaker device 1, for the purpose of extending the propagation region β of the false engine sound by the vehicular horn device 4, the sound pressure of the false engine sound which the vehicular horn device 4 generates is raised. This enlarges an overlap region of (i) the region γ where the erroneous recognition is produced by the reflection of the ultrasonic wave and which is extended by the ultrasonic wave directionality extension portion at the slow vehicle speed and (ii) the propagation region β of the false engine sound by the vehicular horn device 4. Thereby, the occurrence of the erroneous recognition by the reflection of the extended ultrasonic wave can be suppressed.

Second Embodiment

A second embodiment of the present invention will be explained as follows.

In a region where a vehicle approaches a pedestrian (i.e., a short distance region where the distance between a vehicle and a pedestrian is short), there is need to make a pedestrian certainly notice the presence of the vehicle. Generating a notice sound having a high sound pressure for the pedestrian is therefore desirable. In addition, even if the distance between the vehicle and the pedestrian is long, it is desirable to notify the pedestrian existing at a long distance of the presence of the vehicle. The vehicle presence notification apparatus is required for achieving the following: (i) generating a notice sound having a comparatively large sound pressure for a pedestrian in the short distance region where the distance of the vehicle and the pedestrian is short; and (ii) simultaneously transmitting a notice sound so as to reach a pedestrian even if the pedestrian exists in a long distance region where the distance of the vehicle and the pedestrian is long, thereby also making the pedestrian in the long distance region notice the presence of the vehicle.

When intending to transmit a notice sound to reach a pedestrian who exists at a long distance from the vehicle in order to satisfy the above (ii) by using a dynamic speaker, it is necessary to enlarge a sound pressure outputted from the dynamic speaker. In that case, a sound pressure which a vehicle occupant such as a driver hears increases, exceeding a limit of the vehicle occupant's sensitivity. On the contrary, when reducing an output level of the dynamic speaker in order to lower a sound pressure of the notice sound which the vehicle occupant hears, the propagation region of the notice sound has to become shorter, making it impossible to notify a pedestrian, who exists at a long distance from the vehicle, of the presence of the vehicle.

The above problem will be explained with reference to FIG. 13. First, a target propagation distance to transmit or deliver a notice sound is designated. When a maximum speed of the vehicle in a snowy road is defined as 20 km/h and a braking distance in the snowy road is estimated to be about 10 m, it is necessary to make a pedestrian, who exists at a 10 meter distance from the vehicle, notice the notice sound. Thus, the target propagation distance is determined as 10 m.

Next, a sound pressure level at the target propagation distance is designated. For instance, the lower limit at which a pedestrian hears a false engine sound is designated as 50 dB. Thus, the sound pressure level of the dynamic speaker is determined such that a pedestrian existing at a 10 meter distance is made to hear a notice sound of not less than 50 dB, using the dynamic speaker. To achieve the above, as illustrated in a broken line J of FIG. 13, the sound pressure level, which the dynamic speaker generates, needs to be set at about 72 dB in the vehicle (i.e., a distance of 0 m).

It is noted that because a notice sound is emitted from the dynamic speaker mounted in the vehicle, a vehicle occupant who is in the vehicle continuously has to hear the notice sound emitted from the dynamic speaker for a long time. Therefore, it is necessary to lower the sound pressure level audible to the vehicle occupant from the limit or threshold value (for example, 65 dB) of the vehicle occupant's sensitivity.

However, the sound pressure of the notice sound which reaches the vehicle occupant in the vehicle compartment exceeds the limit of the vehicle occupant's sensitivity. On the contrary, when reducing an output level of the dynamic speaker in order to lower a sound pressure of the notice sound which the vehicle occupant hears down to the limit of the vehicle occupant's sensitivity, the propagation distance of the notice sound becomes short, making it impossible to send the notice sound to the target propagation distance.

To solve such a problem, the vehicular presence notification apparatus according to the second embodiment is provided as follows.

According to the vehicle presence notification apparatus, the following are provided: (i) in a short distance region near a vehicle S, a notice sound by the dynamic speaker and a notice sound by the parametric speaker device are combined to generate a notice sound having a high sound pressure; and (ii) in a long distance region farther from the vehicle S than the short distance region, a notice sound by the parametric speaker device is generated.

Configuration of Second Embodiment

Here, the configuration of the vehicle presence notification apparatus according to the second embodiment is basically identical to that of the first embodiment; thus, the identical portions are basically not explained while a difference will be explained with reference to FIG. 13.

(Explanation of Designating Sound Pressure of Vehicular Horn Device 4 and Parametric Speaker Device 1)

The vehicle presence notification apparatus according to the present second embodiment operates as follows. (i) In a predetermined short distance region (e.g., 0 m to 5 m ahead of the front end of the vehicle S), a false engine sound by the vehicular horn device 4 and a false engine sound by the parametric speaker device 1 are combined, thereby generating a false engine sound having a high sound pressure; and (ii) in a predetermined long distance region (5 m to 10 m ahead of the front end of the vehicle S, the number of piezoelectric speakers 21 to be used and the amplification gains (amplifier gain) of the ultrasonic wave speaker amplifier 25 which were mentioned above are performed, generating a false engine sound by the parametric speaker device 1.

A detailed example will be explained. First, a target propagation region, which a notice sound transmitted to reach, is designated in order to designate a long distance region. In the present second embodiment, the target propagation distance is defined as 10 m. Next, a sound pressure level at the target propagation distance is designated. In the present embodiment, the sound pressure level in the target propagation distance is designated as 50 dB. In that case, in order to achieve a sound pressure level of 50 dB at the target propagation distance of 10 m using the parametric speaker device 1, the number and arrangement of the piezoelectric speakers 21 to be used are designated while the amplification gain of the ultrasonic wave speaker amplifier 25 (refer to the two-dot chain line B in FIG. 13).

Next, the short distance region is designated. In the second embodiment, a range where a false engine sound having a high sound pressure is generated (a region where a pedestrian is certainly notified of the presence of the vehicle) is designated as 5 m or less. In that case, so as to achieve a high sound pressure within a 5 m distance by combining a false engine sound by the vehicular horn device 4 and a false engine sound by the parametric speaker device 1 (the solid line C of FIG. 13), the amplification gain of the horn driving amplifier 26 is designated (refer to the one-dot chain line of FIG. 13).

Figure 13:
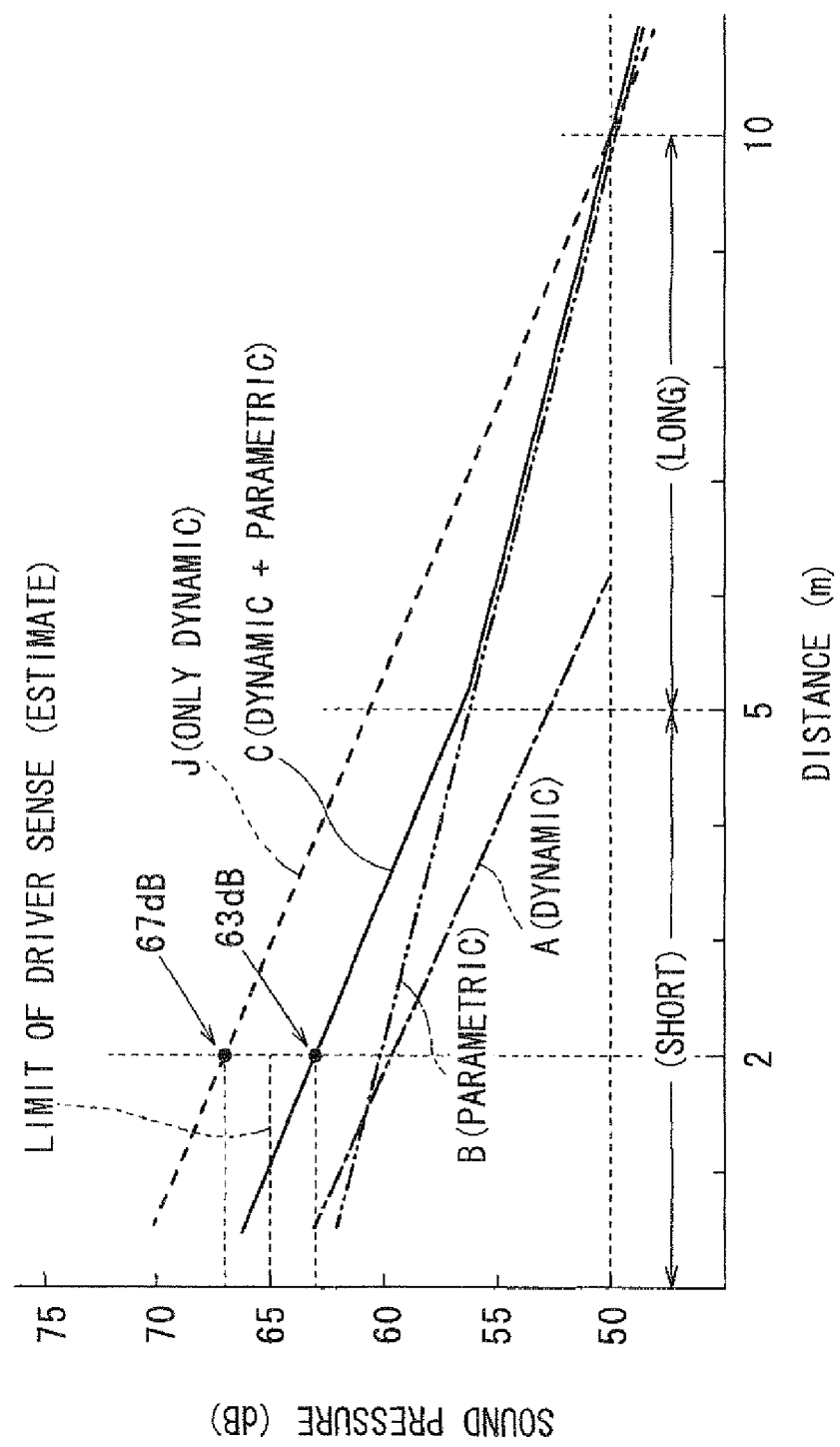
FIG. 13 is a diagram illustrating relation between a distance from a vehicle to a pedestrian, and a sound pressure according to a second embodiment of the present invention.

Thus, as illustrated in the solid line C of FIG. 13, in the vehicle presence notification apparatus, the sound pressure characteristic of a false engine sound as notice sound (also referred to a composite false engine sound or a composite notice sound) relative to the distance exhibits a V character shaped characteristic.

Operation of Second Embodiment

The operation of the vehicle presence notification apparatus of the second embodiment is almost identical to that of the first embodiment; thus, the explanation is omitted.

[Effect 1 of Second Embodiment]

The vehicle presence notification apparatus of the second embodiment adopts the above mentioned configuration, thereby providing the following effect.

(a) In a short distance region (0 m to 5 m) ahead of the vehicle S, a false engine sound by the dynamic speaker 4 (the one-dot chain line A of FIG. 13) and a false engine sound by the parametric speaker device 1 (the two-dot chain line B of FIG. 13) are combined, enabling the generation of the false engine sound having a high sound pressure (the solid line C of FIG. 13). Therefore, in the short distance region (0 m to 5 m) from the vehicle S to a pedestrian, a notice sound having a higher sound pressure can be provided to the pedestrian, thereby notifying the pedestrian of the presence of the vehicle S more certainly.

(b) In the long distance region (5 m to 10 m) ahead of the vehicle S, as illustrated in the two-dot chain line B of FIG. 13, the notice sound emitted by the parametric speaker device 1 can be delivered. Therefore, even if the distance between the vehicle S and the pedestrian is separated, the notice sound or false engine sound can be delivered to the pedestrian and the presence of the vehicle S can be noticed by the pedestrian separated away from the vehicle S.

(c) The parametric speaker device 1 emits the ultrasonic wave that undergoes the self-demodulation in the air away from the vehicle S to transform into the audible sound; thus, the false engine sound generated by the parametric speaker device 1 can be hardly heard by the vehicle occupant such as a driver. In specific, as shown in FIG. 13, when it is supposed that the sound pressure audible to the vehicle occupant in the vehicle compartment corresponds to the sound pressure level at a distance of 2 m, the sound pressure audible to the vehicle occupant in the vehicle compartment is suppressed at 63 dB lower than the limit (65 dB) of the vehicle occupant's sensitivity. Thus, in the short distance region, the false engine sound by the dynamic speaker 4 and the false engine sound by the parametric speaker device 1 are combined, generating the false engine sound having a high sound pressure. The vehicle occupant existing inside of the vehicle or vehicle compartment does not easily hear the false engine sound by the parametric speaker device 1; namely, the sound pressure of the false engine sound which the vehicle occupant hears can be suppressed.

As explained above, the vehicle presence notification apparatus operates as follows: (i) generating a false engine sound having a high sound pressure for a pedestrian existing at a short distance; (ii) transmitting a false engine sound to reach a pedestrian existing at a long distance; and (iii) lowering a sound pressure of a false engine sound which a vehicle occupant such as a driver hears. That is, the vehicle presence notification apparatus can generate a false engine sound which the vehicle occupant such as a driver cannot hear easily but the pedestrian can notice easily.

[Effect 2 of Second Embodiment]

In the vehicle presence notification apparatus according to the present second embodiment, as illustrated at an intersection between the one-dot chain line A and the two-dot chain line B of FIG. 13, at a predetermined distance (about 2 m position) between the pedestrian and the vehicle S (i.e., ultrasonic wave speaker 5), the magnitude relation between the false engine sound by the parametric speaker device 1 and the false engine sound by the vehicular horn device 4 is inversed. That is, at a distance of about 2 m or more, the false engine sound by the parametric speaker device 1 has a greater ratio, whereas at a distance of about 2 m or less, the false engine sound by the vehicular horn device 4 has a greater ratio.

In contrast, the parametric speaker device 1 exhibits the shortage of the low-pitched sound, resulting in differing from the dynamic speaker 4 in respect of sound tone. Therefore, when the vehicle S approaches the pedestrian, the sound tone of the false engine sound which the pedestrian hears changes from the sound tone with the insufficient low-pitched sound by the parametric speaker device 1 into the sound tone without the insufficient low-pitched sound by the vehicular horn device 4. Thus, as the vehicle S approaches the pedestrian, the sound tone of the false engine sound changes; thus, the pedestrian easily notices the false engine sound, increasing a probability for the pedestrian to know the presence of the vehicle S.

[Effect 3 of Second Embodiment]

The vehicular horn device 4 of the second embodiment is provided such that when the occupant turns on a horn switch, the self excitation voltage is supplied to generate an alarm sound. That is, the vehicular horn device 4 of the second embodiment serves as both a vehicular horn device 4 which generates an alarm sound and a vehicular horn device 4 which generates a false engine sound. Thereby, it is not necessary to mount separately a dedicated dynamic speaker which generates a false engine sound, enabling suppression in costs of the vehicle presence notification apparatus while making easier securing of the mount space of the vehicular horn device 4 which generates a false engine sound.

INDUSTRIAL AVAILABILITY

In the above embodiments, the notice sound (i.e., false engine sound) is generated in the heading direction of the vehicle S when the vehicle S advances in the forward direction. There is no need to be limited thereto. A notice sound (i.e., false engine sound) may be generated in the back direction or back region of the vehicle S when the vehicle S is moved in the backward direction.

The attachment or installation position of the ultrasonic wave speaker 5 and the vehicular horn device 4 which generates a notice sound (i.e., false engine sound) is not limited to the front portion of the vehicle S. For instance, the ultrasonic wave speaker 5 may be attached so as to face a back area with respect to the vehicle S or to face an area below the vehicle S. Thereby, the notice sound (i.e., false engine sound) may be emitted to the area at the back of the vehicle S when the vehicle S is moved in the back direction of the vehicle S.

The term of the "pedestrian" is a general term for a "person" who is a target of protection at the time of vehicle traveling, and is not necessarily limited to a "person, who is walking, in a narrow sense. That is, the pedestrian includes a person who is running, stopping, sitting, or sitting in a wheel chair in an advancing direction of the vehicle S or in a vicinity of the vehicle S.

Aspects of the disclosure described herein are set out in the following clauses.

As a first aspect of the disclosure, a vehicle presence notification apparatus that generates a false engine sound towards an outside of a vehicle is provided to report a presence of the vehicle. The vehicle presence notification apparatus uses: a parametric speaker device that emits ultrasonic waves, which are prepared by applying an ultrasonic wave modulation to a false engine sound, towards an outside of the vehicle; and a vehicular horn device, wherein an application of a direct-current self excitation voltage exceeding a threshold value produces an intermittence of a magnetic force to cause a moving iron core to vibrate; a vibrating plate connected to the moving iron core vibrates along with the moving iron core, so that the vehicular horn device generates an alarm sound. Here, the vehicle presence notification apparatus provides the vehicular horn device with an electrical signal, which configures a false engine sound with a separate excitation voltage lower than the self excitation voltage, causing the vehicular horn device to generate the false engine sound.

As a second aspect of the disclosure, a vehicle presence notification apparatus that generates a false engine sound towards an outside of a vehicle is provided to report a presence of the vehicle. The vehicle includes a vehicular horn device of an electromagnetic type that generates an alarm sound by an application of a self excitation voltage on direct current exceeding a threshold voltage. The vehicle presence notification apparatus includes an ultrasonic wave speaker that emits, towards an outside of the vehicle, amplitude modulated ultrasonic waves to which an ultrasonic wave modulation was applied, the amplitude modulated ultrasonic waves undergoing a self-demodulation in air during propagating to generate an audible sound; and a notice sound controller that controls not only the ultrasonic wave speaker but also the vehicular horn device for generating a false engine sound in the outside of the vehicle. Here, the notice sound controller provides the ultrasonic wave speaker with amplitude modulated ultrasonic waves to which an ultrasonic wave modulation was applied to configure a false engine, causing the ultrasonic wave speaker to emit the amplitude modulated ultrasonic waves configuring the false engine sound, the false engine sound becoming audible in air during propagating; and the notice sound controller provides the vehicular horn device with an electrical signal, which configures a false engine sound with a separate excitation voltage lower than the self excitation voltage, causing the vehicular horn device to serve as a dynamic speaker to emit the false engine sound configured by the electrical signal, the false engine sound being emitted audible.

Further, it is noted that the false engine sound by the parametric speaker device has a strong tendency to advance straight. Therefore, when the false engine sound by the parametric speaker device is reflected by a reflecting object (for example, a signboard) existing in a sidewalk etc., a pedestrian hears the false engine sound from a direction different from the direction of the vehicle. That is, the erroneous recognition arises due to the reflection of the ultrasonic wave.

To that end, as an optional aspect of the disclosure, in the above vehicular presence notification apparatus, an ultrasonic wave speaker in the parametric speaker device may be arranged adjacent to the vehicular horn device.

Thus, the adjacent arrangement between the vehicular horn device and the ultrasonic wave speaker of the parametric speaker device results in enlarging an overlap area in which (i) a region where the erroneous recognition is produced by the reflection of the ultrasonic wave and (ii) a region where the false engine sound by the vehicular horn device is delivered. Furthermore, in such an overlap area, the pedestrian can hear also the false engine sound by the vehicular horn device, suppressing the erroneous recognition by the reflection of the ultrasonic wave by the parametric speaker device.

Further, an ultrasonic directionality extension portion may be included which extends a directionality of an ultrasonic wave which the ultrasonic wave speaker generates when a travel speed of the vehicle is below a predetermined speed.

Thus, a pedestrian in a wider region can be notified of the false engine sound; such a notification region relative to a vehicle at a slow speed can be extended.

Yet further, when the ultrasonic directionality extension portion extends the directionality of the ultrasonic wave speaker, a sound pressure of the false engine sound which the vehicular horn device generates may be increased.

Thus, in conjunction with the extension of the propagation region of the false engine sound by the parametric speaker device, a propagation region of the false engine sound by the vehicular horn device can be extended. Thereby, as compared with the case where only the propagation region by the parametric speaker device is extended, an overlap region can be enlarged, thereby suppressing an erroneous recognition by the reflection of the ultrasonic wave.

As another optional aspect, in the vehicle presence notification apparatus, when a horn switch is operated by an occupant of the vehicle, the self excitation voltage may be given to the vehicular horn device so as to generate an alarm sound.

Thus, the vehicular horn device is shared by both of the function as outputting an alarm sound and the function as outputting a false engine sound, thereby reducing costs in the vehicle presence notification apparatus and making easier securing of a mount space of a vehicular horn device which generates a false engine sound.

As a third aspect of the disclosure, a vehicle presence notification apparatus that announces a presence of a vehicle using a notice sound is provided as follows. The vehicle presence notification apparatus generates a notice sound towards an outside of the vehicle using a dynamic speaker that generates audible sonic waves depending on a magnetic force change accompanying a voltage change applied to a coil, and generates a notice sound towards an outside of the vehicle also using a parametric speaker device that emits ultrasonic waves which an ultrasonic wave modulation is applied to. Here, (i) in a short distance region that is close to the vehicle, the notice sound by the dynamic speaker and the notice sound by the parametric speaker device are combined to generate a notice sound with a high sound pressure; and (ii) in a long distance region that is farther than the short distance region with respect to the vehicle, the notice sound by the parametric speaker device is generated.

As a fourth aspect of the disclosure, a vehicle presence notification apparatus that announces a presence of a vehicle using a notice sound is provided as follows. The vehicle presence notification apparatus includes: a dynamic speaker that emits towards an outside of the vehicle a notice sound configured by audible sonic waves that are generated depending on a magnetic force change accompanying a voltage change applied to a coil; an ultrasonic wave speaker that emits, towards an outside of the vehicle, amplitude modulated ultrasonic waves to which an ultrasonic wave modulation was applied, the amplitude modulated ultrasonic waves undergoing a self-demodulation in air during propagating to generate a notice sound being audible; and a notice sound controller that controls emitting of the dynamic speaker and the ultrasonic wave speaker such that: (i) in a short distance region that is close to the vehicle, the notice sound by the dynamic speaker and the notice sound by the ultrasonic wave speaker are audible, in combination, with a high sound pressure; and (ii) in a long distance region that is distant from the vehicle, the notice sound by the ultrasonic wave speaker is audible.

It will be obvious to those skilled in the art that various changes may be made in the above-described embodiments of the present invention. However, the scope of the present invention should be determined by the following claims.

What is claimed:
1. A vehicle presence notification apparatus that generates a false engine sound towards an outside of a vehicle to report a presence of the vehicle,
the vehicle presence notification apparatus using:
a parametric speaker device that emits ultrasonic waves, which are prepared by applying an ultrasonic wave modulation to a false engine sound, towards an outside of the vehicle; and
a vehicular horn device, wherein an application of a direct-current self excitation voltage exceeding a threshold value produces an intermittence of a magnetic force to cause a moving iron core to vibrate; a vibrating plate connected to the moving iron core vibrates along with the moving iron core, so that the vehicular horn device generates an alarm sound,
wherein the vehicle presence notification apparatus provides the vehicular horn device with an electrical signal, which configures a false engine sound with a separate excitation voltage lower than the self excitation voltage, causing the vehicular horn device to generate the false engine sound.
2. The vehicle presence notification apparatus according to claim 1, wherein
the parametric speaker device includes an ultrasonic wave speaker that is arranged adjacent to the vehicular horn device.

3. The vehicle presence notification apparatus according to claim 2, further comprising:
an ultrasonic directionality extension portion that extends a directionality of an ultrasonic wave which the ultrasonic wave speaker generates when a travel speed of the vehicle is below a predetermined speed.

4. The vehicle presence notification apparatus according to claim 3, wherein
when the ultrasonic directionality extension portion extends the directionality of the ultrasonic wave speaker, a sound pressure of the false engine sound which the vehicular horn device generates is increased.

5. The vehicle presence notification apparatus according to claim 1, wherein
when a horn switch is operated by an occupant of the vehicle, the self excitation voltage is given to the vehicular horn device so as to generate an alarm sound.

6. A vehicle presence notification apparatus that generates a false engine sound towards an outside of a vehicle to report a presence of the vehicle,
the vehicle including a vehicular horn device of an electromagnetic type that generates an alarm sound by an application of a self excitation voltage on direct current exceeding a threshold voltage,
the vehicle presence notification apparatus comprising:
an ultrasonic wave speaker that emits, towards an outside of the vehicle, amplitude modulated ultrasonic waves to which an ultrasonic wave modulation was applied, the amplitude modulated ultrasonic waves undergoing a self-demodulation in air during propagating to generate an audible sound; and
a notice sound controller that controls not only the ultrasonic wave speaker but also the vehicular horn device for generating a false engine sound in the outside of the vehicle,
wherein:
the notice sound controller provides the ultrasonic wave speaker with amplitude modulated ultrasonic waves to which an ultrasonic wave modulation was applied to configure a false engine, causing the ultrasonic wave speaker to emit the amplitude modulated ultrasonic waves configuring the false engine sound, the false engine sound becoming audible in air during propagating; and
the notice sound controller provides the vehicular horn device with an electrical signal, which configures a false engine sound with a separate excitation voltage lower than the self excitation voltage, causing the vehicular horn device to serve as a dynamic speaker to emit the false engine sound configured by the electrical signal, the false engine sound being emitted audible.

7. A vehicle presence notification apparatus that announces a presence of a vehicle using a notice sound,
the vehicle presence notification apparatus
generating a notice sound towards an outside of the vehicle using a dynamic speaker that generates audible sonic waves depending on a magnetic force change accompanying a voltage change applied to a coil, and
generating a notice sound towards an outside of the vehicle also using a parametric speaker device that emits ultrasonic waves which an ultrasonic wave modulation is applied to,
wherein:
(i) in a short distance region that is close to the vehicle, the notice sound by the dynamic speaker and the notice sound by the parametric speaker device are combined to generate a notice sound with a high sound pressure; and
(ii) in a long distance region that is farther than the short distance region with respect to the vehicle, the notice sound by the parametric speaker device is generated.

8. The vehicle presence notification apparatus according to claim 7, wherein:
the dynamic speaker is an electromagnetic vehicular horn device;
when receiving a self excitation voltage greater than a threshold value on direct current, the vehicular horn device generates an alarm sound; and
when receiving an electrical signal, which configures a notice sound, using a separate excitation voltage lower than the self excitation voltage, the vehicular horn device generates the notice sound.

9. The vehicle presence notification apparatus according to claim 8, wherein
when a horn switch is operated by an occupant of the vehicle, the self excitation voltage is given to the vehicular horn device so as to generate the alarm sound.

10. The vehicle presence notification apparatus according to claim 7, wherein
the notice sound emitted from the dynamic speaker and the parametric speaker device is a false engine sound,
the vehicle present notification apparatus further comprising:
a false engine preparation portion that prepares the false engine sound using a digital processing technique.

11. A vehicle presence notification apparatus that announces a presence of a vehicle using a notice sound,
the vehicle presence notification apparatus comprising:
a dynamic speaker that emits towards an outside of the vehicle a notice sound configured by audible sonic waves that are generated depending on a magnetic force change accompanying a voltage change applied to a coil;
an ultrasonic wave speaker that emits, towards an outside of the vehicle, amplitude modulated ultrasonic waves to which an ultrasonic wave modulation was applied, the amplitude modulated ultrasonic waves undergoing a self-demodulation in air during propagating to generate a notice sound being audible; and
a notice sound controller that controls emitting of the dynamic speaker and the ultrasonic wave speaker such that:
(i) in a short distance region that is close to the vehicle, the notice sound by the dynamic speaker and the notice sound by the ultrasonic wave speaker are audible, in combination, with a high sound pressure; and
(ii) in a long distance region that is distant from the vehicle, the notice sound by the ultrasonic wave speaker is audible.

* * * * *